United States Patent
Oyama

(10) Patent No.: US 12,488,458 B2
(45) Date of Patent: Dec. 2, 2025

(54) IMAGE PROCESSING DEVICE, IMAGE PROCESSING METHOD, AND PROGRAM FOR OUTPUTTING INFORMATION FOR DISPLAYING TWO-DIMENSIONAL IMAGE CORRESPONDING TO CROSS SECTION

(71) Applicant: FUJIFILM Corporation, Tokyo (JP)

(72) Inventor: Yuka Oyama, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 494 days.

(21) Appl. No.: 17/953,340

(22) Filed: Sep. 27, 2022

(65) Prior Publication Data

US 2023/0099565 A1 Mar. 30, 2023

(30) Foreign Application Priority Data

Sep. 30, 2021 (JP) ................... 2021-161790

(51) Int. Cl.
| | |
|---|---|
| G06T 7/00 | (2017.01) |
| G06T 7/60 | (2017.01) |
| G06T 7/70 | (2017.01) |
| G06V 10/25 | (2022.01) |

(52) U.S. Cl.
CPC .............. *G06T 7/0012* (2013.01); *G06T 7/60* (2013.01); *G06T 7/70* (2017.01); *G06V 10/25* (2022.01); *G06T 2207/30096* (2013.01)

(58) Field of Classification Search
None
See application file for complete search history.

(56) References Cited

U.S. PATENT DOCUMENTS

| | | |
|---|---|---|
| 7,369,691 B2 | 5/2008 | Kondo et al. |
| 10,403,039 B2 | 9/2019 | Kutra et al. |
| 11,037,672 B2 | 6/2021 | Nagata |
| 2009/0018533 A1 | 1/2009 | Perkins et al. |
| 2009/0227998 A1 | 9/2009 | Aljuri et al. |

(Continued)

FOREIGN PATENT DOCUMENTS

| | | |
|---|---|---|
| EP | 3432797 | 6/2021 |
| JP | 2001283191 | 10/2001 |

(Continued)

OTHER PUBLICATIONS

"Notice of Reasons for Refusal of Japan Counterpart Application", issued on Feb. 4, 2025, with English translation thereof, p. 1-p. 7.

(Continued)

*Primary Examiner* — Lennin R Rodriguezgonzalez
(74) *Attorney, Agent, or Firm* — JCIPRNET

(57) ABSTRACT

An image processing device includes a processor, and the processor is configured to output information for displaying a three-dimensional target part image as a three-dimensional image showing a target part, on a display device, calculate a virtual axis of the target part in the three-dimensional target part image, output information for displaying a two-dimensional image corresponding to a first cross section crossing a first position on the virtual axis, on the display device, change a geometrical characteristic of the first cross section in response to an instruction to change the geometrical characteristic, and output information for displaying a two-dimensional image corresponding to a second cross section obtained by changing the geometrical characteristic, on the display device.

20 Claims, 16 Drawing Sheets

(56) References Cited

U.S. PATENT DOCUMENTS

| | | |
|---|---|---|
| 2011/0184391 A1 | 7/2011 | Aljuri et al. |
| 2013/0253484 A1 | 9/2013 | Aljuri |
| 2013/0253488 A1 | 9/2013 | Aljuri et al. |
| 2013/0267889 A1 | 10/2013 | Aljuri et al. |
| 2015/0045777 A1 | 2/2015 | Aljuri et al. |
| 2015/0057646 A1 | 2/2015 | Aljuri et al. |
| 2015/0088107 A1 | 3/2015 | Aljuri et al. |
| 2015/0088110 A1 | 3/2015 | Aljuri et al. |
| 2015/0313666 A1 | 11/2015 | Aljuri et al. |
| 2015/0335344 A1 | 11/2015 | Aljuri et al. |
| 2016/0074059 A1 | 3/2016 | Aljuri et al. |
| 2016/0143778 A1 | 5/2016 | Aljuri et al. |
| 2016/0228141 A1 | 8/2016 | Aljuri |
| 2017/0172548 A1 | 6/2017 | Aljuri et al. |
| 2017/0172668 A1 | 6/2017 | Aljuri et al. |
| 2017/0231605 A1 | 8/2017 | Aljuri et al. |
| 2017/0231655 A1 | 8/2017 | Aljuri et al. |
| 2017/0232228 A1 | 8/2017 | Aljuri et al. |
| 2017/0232271 A1 | 8/2017 | Aljuri et al. |
| 2017/0232272 A1 | 8/2017 | Perkins et al. |
| 2017/0232273 A1 | 8/2017 | Aljuri et al. |
| 2017/0245878 A1 | 8/2017 | Aljuri et al. |
| 2018/0263647 A1 | 9/2018 | Aljuri et al. |
| 2019/0105023 A1 | 4/2019 | Aljuri et al. |
| 2019/0216485 A1 | 7/2019 | Aljuri et al. |
| 2019/0231426 A1 | 8/2019 | Aljuri et al. |
| 2019/0240505 A1 | 8/2019 | Aljuri et al. |
| 2019/0247071 A1 | 8/2019 | Aljuri |
| 2019/0380730 A1 | 12/2019 | Aljuri et al. |
| 2020/0323590 A1 | 10/2020 | Aljuri et al. |
| 2020/0330118 A1 | 10/2020 | Aljuri et al. |
| 2020/0375622 A1 | 12/2020 | Aljuri et al. |
| 2021/0128189 A1 | 5/2021 | Aljuri et al. |
| 2021/0251646 A1 | 8/2021 | Aljuri et al. |
| 2021/0251690 A1 | 8/2021 | Aljuri et al. |
| 2021/0282868 A1 | 9/2021 | Aljuri et al. |
| 2021/0307826 A1 | 10/2021 | Aljuri et al. |
| 2021/0308484 A1 | 10/2021 | Aljuri et al. |
| 2022/0071606 A1 | 3/2022 | Aljuri et al. |
| 2022/0079613 A1 | 3/2022 | Aljuri et al. |
| 2022/0096112 A1 | 3/2022 | Aljuri et al. |

FOREIGN PATENT DOCUMENTS

| | | |
|---|---|---|
| JP | 2003339644 | 12/2003 |
| JP | 2004283373 | 10/2004 |
| JP | 2008173159 | 7/2008 |
| JP | 2011224194 | 11/2011 |
| JP | 2015509789 | 4/2015 |
| JP | 2017202583 | 11/2017 |
| JP | 2018504164 | 2/2018 |
| JP | 2019510565 | 4/2019 |
| JP | 2020120827 | 8/2020 |
| WO | 2017034020 | 3/2017 |

OTHER PUBLICATIONS

"Decision of Refusal of Japan Counterpart Application", issued on May 27, 2025, with English translation thereof, p. 1-p. 5.

FIG. 11
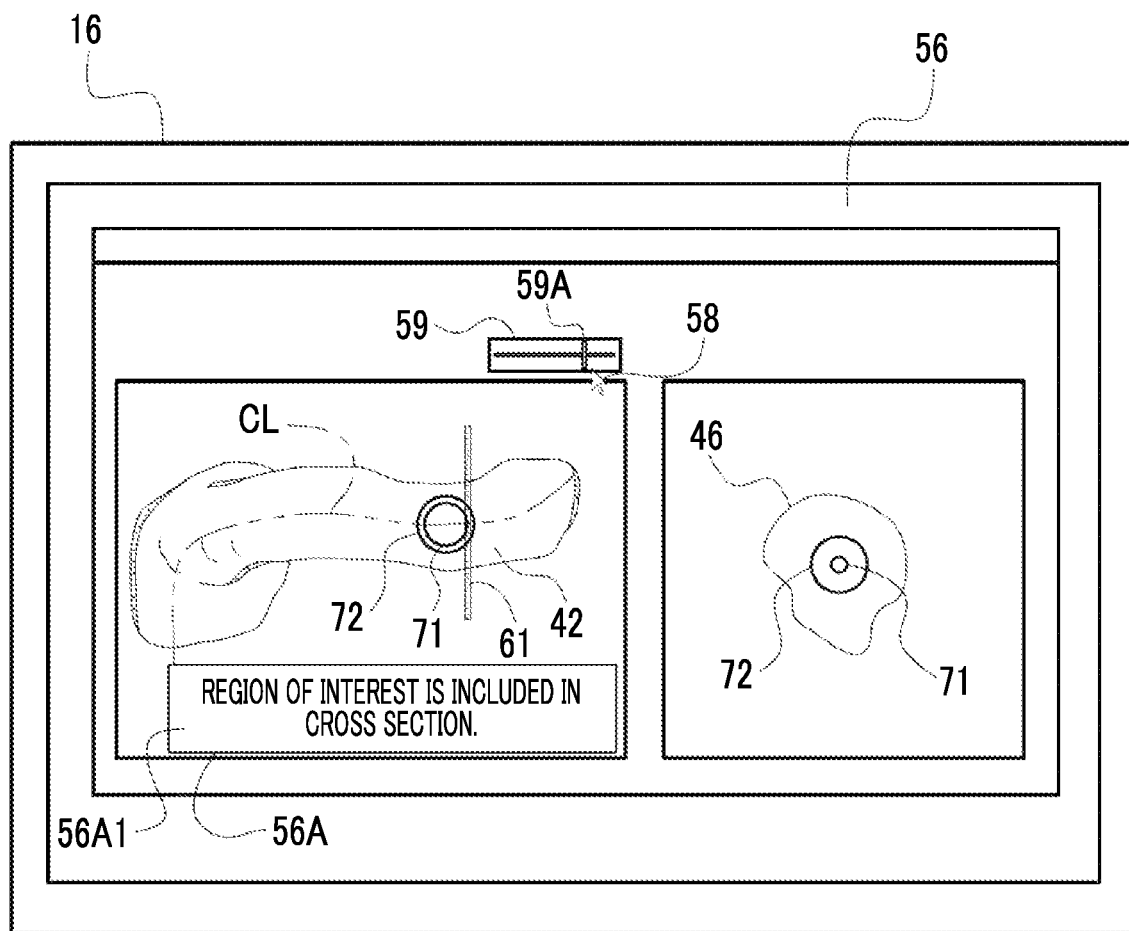
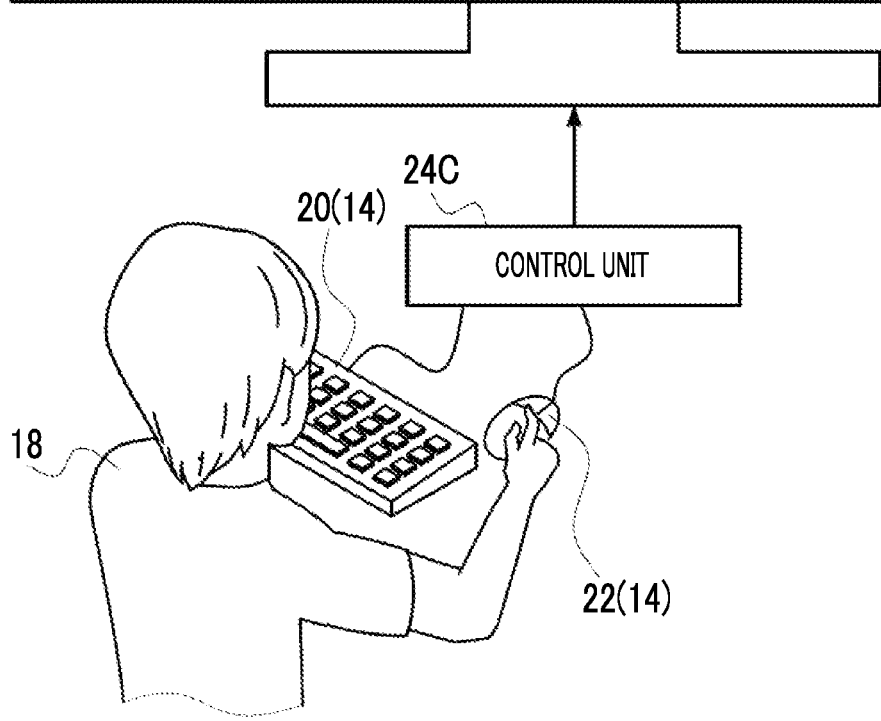

IMAGE PROCESSING DEVICE, IMAGE PROCESSING METHOD, AND PROGRAM FOR OUTPUTTING INFORMATION FOR DISPLAYING TWO-DIMENSIONAL IMAGE CORRESPONDING TO CROSS SECTION

CROSS-REFERENCE TO RELATED APPLICATION

This application claims priority from Japanese Patent Application No. 2021-161790, filed Sep. 30, 2021, the disclosure of which is incorporated herein by reference in its entirety.

BACKGROUND

Technical Field

A technique of the present disclosure relates to an image processing device, an image processing method, and a non-transitory storage medium storing program.

Related Art

JP2015-509789A discloses a method for tissue ablation including placing an energy source in a tissue, aligning energy radially outward from the energy source toward the tissue, and moving the energy source to remove a tissue having a predetermined capacity, in which the movement of the energy source is at least partially controlled by an automatic controller.

JP2011-224194A discloses a medical information presentation device comprising a first processing unit that designates, for three-dimensional image data of an object acquired by a plurality of different types of medical image diagnostic apparatuses, a display region using a three-dimensional solid model corresponding to the three-dimensional image data, a second processing unit that associates an image coordinate system of the three-dimensional image data and a measurement coordinate system defined for the three-dimensional solid model with each other, a third processing unit that sets a region designated using the three-dimensional solid model as a designated region, specifies a region corresponding to the designated region from the three-dimensional image data, and composes an image of the region, and a fourth processing unit that presents the image of the region corresponding to the designated region.

JP2008-173159A discloses a surgery support system comprising a measurement unit that acquires surgery progress information including an image of a subject placed in a space for surgery in real time, a recording unit that records a three-dimensional image of the subject acquired in advance and the surgery progress information acquired by the measurement unit, an input and output unit comprising an input unit configured to input a command from an operator and an output unit configured to display a GUI necessary for an input of the operator and the surgery progress information and the three-dimensional image recorded in the recording unit, a calculation unit that calculates surgery guide information based on the three-dimensional image of the subject recorded in the recording unit and on the command of the operator input through the input and output unit, records the calculated surgery guide information, and displays the surgery guide information on a display unit, and a control unit that controls the measurement unit, the recording unit, the input and output unit, and the calculation unit, in which the calculation unit comprises a comparison unit that compares the real-time surgery progress information acquired by the measurement unit with the surgery guide information and displays a comparison result on the display unit, and a surgery guide information updating unit that calculates the surgery guide information using the real-time subject image acquired by the measurement unit and updates the most recently calculated surgery guide information.

SUMMARY

An embodiment according to the technique of the present disclosure provides an image processing device, an image processing method, and a non-transitory storage medium storing program capable of simply and easily searching for a cross section in a target part without using a virtual axis in a three-dimensional target part image, compared to a case where a geometrical characteristic of a cross section cannot be changed.

A first aspect according to the technique of the present disclosure is an image processing device comprising a processor, in which the processor is configured to output information for displaying a three-dimensional target part image as a three-dimensional image showing a target part, on a display device, calculate a virtual axis of the target part in the three-dimensional target part image, output information for displaying a two-dimensional image corresponding to a first cross section crossing a first position on the virtual axis, on the display device, change a geometrical characteristic of the first cross section in response to an instruction to change the geometrical characteristic, and output information for displaying a two-dimensional image corresponding to a second cross section obtained by changing the geometrical characteristic of the first cross section, on the display device.

A second aspect according to the technique of the present disclosure is an image processing method comprising outputting information for displaying a three-dimensional target part image as a three-dimensional image showing a target part, on a display device, calculating a virtual axis of the target part in the three-dimensional target part image, outputting information for displaying a two-dimensional image corresponding to a first cross section crossing a first position on the virtual axis, on the display device, changing a geometrical characteristic of the first cross section in response to an instruction to change the geometrical characteristic, and outputting information for displaying a two-dimensional image corresponding to a second cross section obtained by changing the geometrical characteristic of the first cross section, on the display device.

A third aspect according to the technique of the present disclosure is a non-transitory storage medium storing a program that causes a computer to execute a process, the process comprising outputting information for displaying a three-dimensional target part image as a three-dimensional image showing a target part, on a display device, calculating a virtual axis of the target part in the three-dimensional target part image, outputting information for displaying a two-dimensional image corresponding to a first cross section crossing a first position on the virtual axis, on the display device, changing a geometrical characteristic of the first cross section in response to an instruction to change the geometrical characteristic, and outputting information for displaying a two-dimensional image corresponding to a second cross section obtained by changing the geometrical characteristic of the first cross section, on the display device.

BRIEF DESCRIPTION OF THE DRAWINGS

FIG. 11 is a conceptual diagram showing an example of an aspect where a change instruction of a geometrical characteristic of the first cross section is received.

DESCRIPTION OF THE PREFERRED EMBODIMENTS

An example of an embodiment of an image processing device, an image processing method, and a program according to the technique of the present disclosure will be described with reference to the accompanying drawings.

First Embodiment

Figure 1:
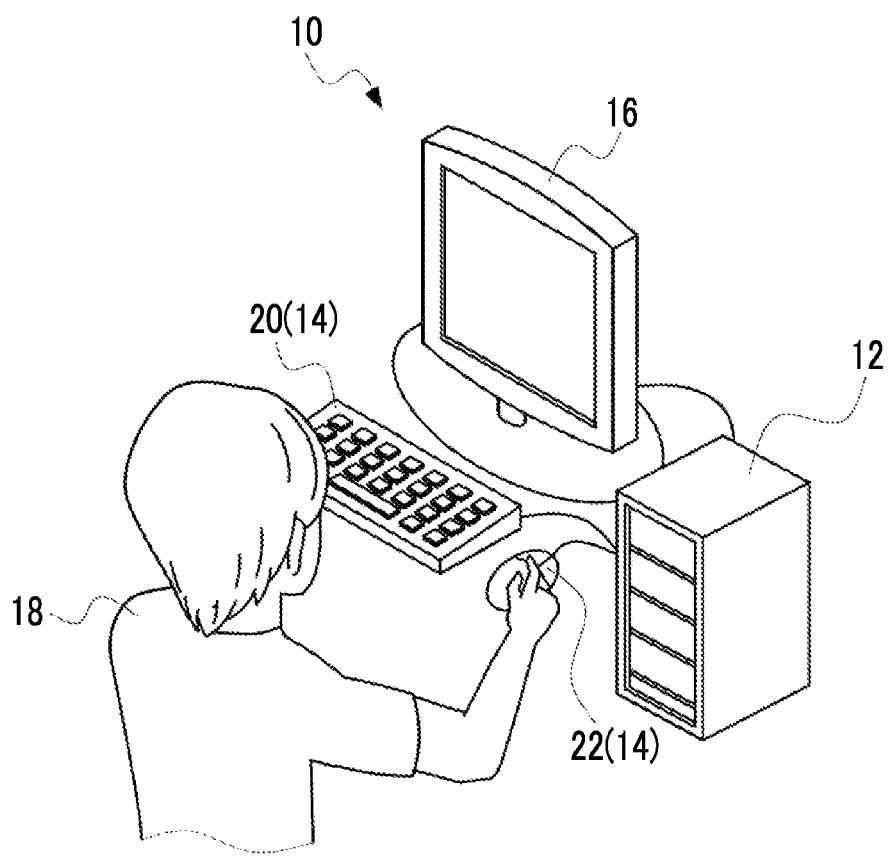
FIG. 1 is a conceptual diagram showing a schematic configuration of a medical service support device.

As shown in FIG. 1 as an example, a medical service support device 10 comprises an image processing device 12, a reception device 14, and a display device 16, and is used by a user 18. Here, examples of the user 18 include a physician and/or a technician.

The reception device 14 is connected to the image processing device 12. The reception device 14 receives an instruction from the user 18. The reception device 14 has a keyboard 20, a mouse 22, and the like. The instruction received by the reception device 14 is acquired by a processor 24. The keyboard 20 and the mouse 22 shown in FIG. 1 are merely an example. As the reception device 14, any one of the keyboard 20 or the mouse 22 may be provided. As the reception device 14, for example, at least one of an approach input device that receives an approach input, a voice input device that receives a voice input, or a gesture input device that receives a gesture input may be applied instead of the keyboard 20 and/or the mouse 22. The approach input device is, for example, a touch panel, a tablet, or the like.

The display device 16 is connected to the image processing device 12. Examples of the display device 16 include an electro-luminescence (EL) display and a liquid crystal display. The display device 16 displays various kinds of information (for example, an image, text, and the like) under the control of the image processing device 12. The display device 16 is an example of a "display device" according to the technique of the present disclosure.

Figure 2:
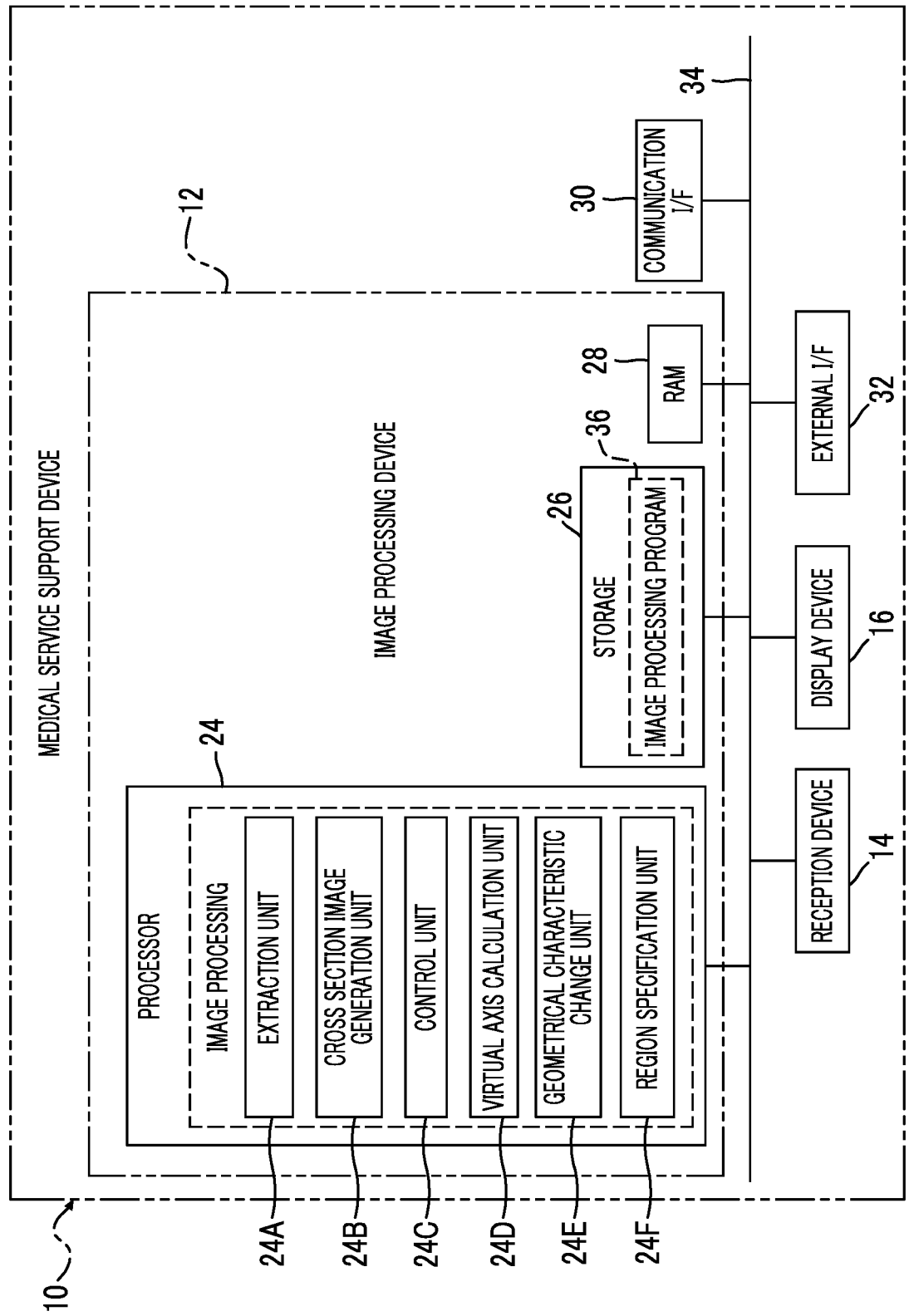
FIG. 2 is a block diagram showing an example of a hardware configuration of an electric system of the medical service support device.

As shown in FIG. 2 as an example, the medical service support device 10 comprises a communication interface (I/F) 30, an external I/F 32, and a bus 34, in addition to the image processing device 12, the reception device 14, and the display device 16.

The image processing device 12 is an example of an "image processing device" according to the technique of the present disclosure, and comprises a processor 24, a storage 26, and a random access memory (RAM) 28. The processor 24, the storage 26, the RAM 28, the communication I/F 30, and the external I/F 32 are connected to the bus 34.

A memory is connected to the processor 24. The memory includes the storage 26 and the RAM 28. The processor 24 has, for example, a central processing unit (CPU) and a graphics processing unit (GPU). The GPU operates under the control of the CPU and is responsible for execution of processing regarding an image.

The storage 26 is a nonvolatile storage device that stores various programs, various parameters, and the like. Examples of the storage 26 include a flash memory (for example, an electrically erasable and programmable read only memory (EEPROM), a solid state drive (SSD), or the like) and/or a hard disk drive (HDD). A flash memory and an HDD are merely an example, and at least one of a flash memory, an HDD, a magnetoresistive memory, or a ferroelectric memory may be used as the storage 26.

The RAM 28 is a memory in which information is temporarily stored and is used as a work memory by the processor 24. Examples of the RAM 28 include a dynamic random access memory (DRAM) and a static random access memory (SRAM).

The communication I/F 30 is connected to a network (not shown). The network may be configured with at least one of a local area network (LAN) or a wide area network (WAN). An external device (not shown) and the like are connected to the network, and the communication I/F 30 controls transfer of information with an external communication device through the network. The external communication device may include, for example, at least one of a computed tomography (CT) apparatus, a magnetic resonance imaging (MRI) apparatus, a personal computer, or a smart device. For example, the communication I/F 30 transmits information depending on a request from the processor 24 to the external communication device through the network. The communication I/F 30 receives information transmitted from the external communication device and outputs the received information to the processor 24 through the bus 34.

The external I/F 32 controls transfer of various kinds of information with an external device (not shown) outside the medical service support device 10. The external device may be, for example, at least one of a smart device, a personal computer, a server, a universal serial bus (USB) memory, a memory card, or a printer. An example of the external I/F 32 is a USB interface. The external device is connected directly or indirectly to the USB interface.

Before surgery for ablating a malignant tumor, such as pancreatic cancer, from an organ, a region to be ablated is determined and planned before surgery using a plurality of two-dimensional slice images or the like obtained by imaging a patient as a subject with a modality, such as a CT apparatus and/or an MM apparatus, thereby increasing the safety of surgery.

Note that various cross sections are possible depending on a shape of an organ to be ablated or on a position of an ablation part, and there is still room for improvement in simply and easily searching for a cross section suitable for ablation. Accordingly, in the technique of the present disclosure, in a simulation of a cross section for ablation, as shown in FIG. 2 as an example, image processing is executed by the processor 24 such that a search for a cross section can be performed more simply and easily.

An image processing program 36 is stored in the storage 26. The processor 24 reads out the image processing program 36 from the storage 26 and executes the read-out image processing program 36 on the RAM 28 to execute image processing. The image processing is realized by the processor 24 operating as an extraction unit 24A, a cross section image generation unit 24B, a control unit 24C, a virtual axis calculation unit 24D, a geometrical characteristic change unit 24E, and a region specification unit 24F. The image processing program 36 is an example of a "program" according to the technique of the present disclosure.

Figure 3:
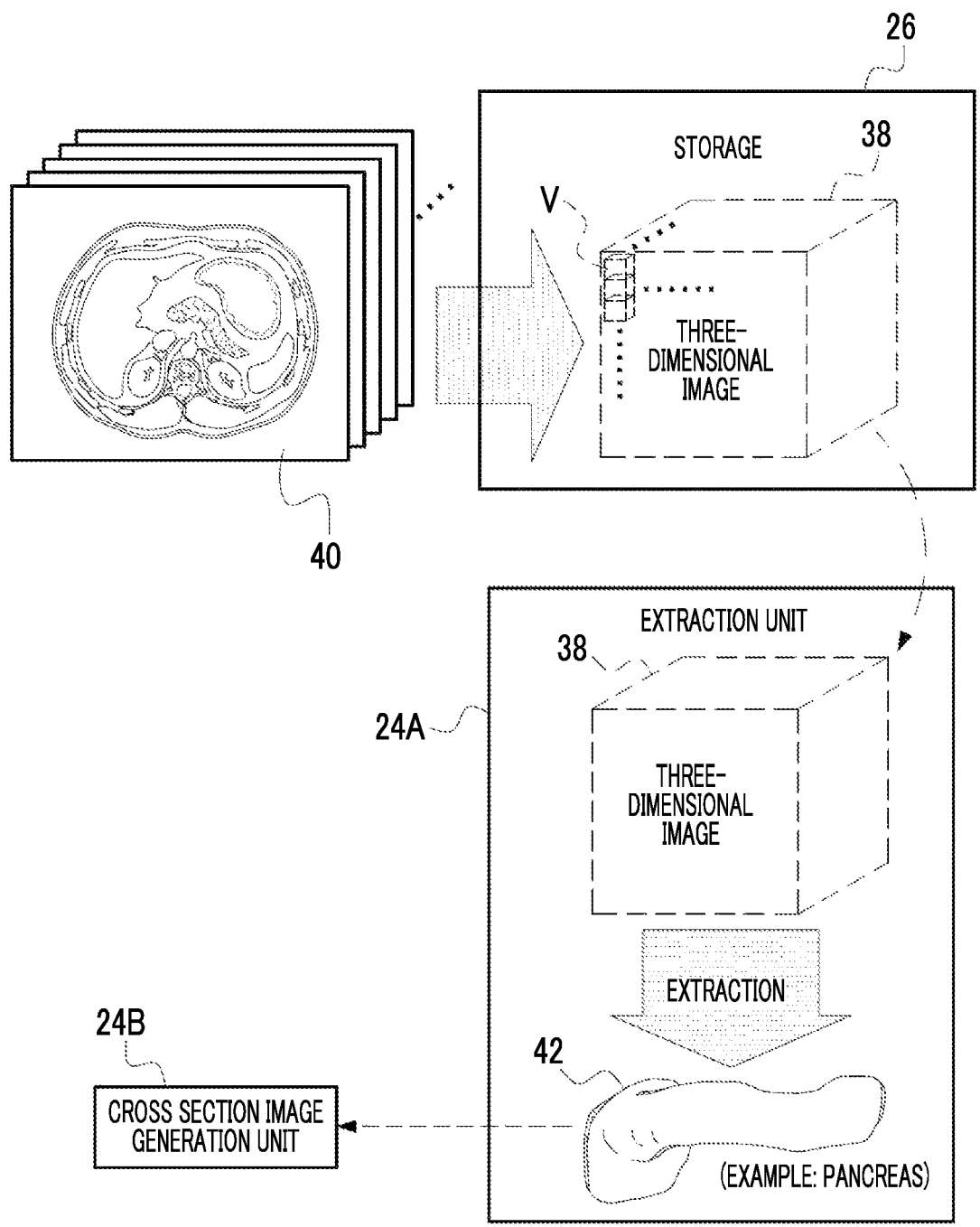
FIG. 3 is a conceptual diagram showing an example of processing contents of an extraction unit.

As shown in FIG. 3 as an example, a three-dimensional image 38 is stored in the storage 26. The three-dimensional image 38 is an image obtained by piling a plurality of two-dimensional slice images 40 obtained by imaging a patient with a modality and dividing the pile of images into voxels V. An example of the modality is a CT apparatus. The CT apparatus is merely an example, and other examples of the modality are an MRI apparatus, an ultrasound diagnostic apparatus, and the like. In the example shown in FIG. 3, although a two-dimensional slice image of a transverse plane is shown as a two-dimensional slice image 40, the technique of the present disclosure is not limited thereto, and a two-dimensional slice image of a coronal plane may be used, or a two-dimensional slice image of a sagittal plane may be used. A position of each of all voxels V defining the three-dimensional image is specified by three-dimensional coordinates. Each voxel V is given, for example, a white and black shading value, such as a CT value.

The extraction unit 24A acquires the three-dimensional image 38 from the storage 26 and extracts a three-dimensional organ image 42 from the acquired three-dimensional image 38. The three-dimensional organ image 42 is a three-dimensional image showing an organ. For example, the three-dimensional image 38 includes a plurality of three-dimensional organ images 42, and each of the three-dimensional organ images 42 is given a unique identifier. The three-dimensional organ image 42 is extracted from the three-dimensional image 38 in response to an instruction received by the reception device 14. For example, the extraction unit 24A extracts the three-dimensional organ image 42 corresponding to an identifier received by the reception device 14 from the three-dimensional image 38. In the example shown in FIG. 3, an image showing a pancreas is shown as an example of the three-dimensional organ image 42. The three-dimensional organ image 42 is an example of a "three-dimensional target part image" according to the technique of the present disclosure. A unique identifier of each organ may be given to each voxel V of the three-dimensional image 38, and opacity and color information of red (R), green (G), and blue (B) may be set in the identifier of each organ. With this, each voxel V is given data (hereinafter, referred to as "voxel data"), such as opacity depending on the corresponding organ and color information of red (R), green (G), and blue (B), in addition to white and black shading value information.

Here, although an image showing a pancreas is illustrated as an example of the three-dimensional organ image 42, this is merely an example, and an image showing another organ, such as a liver, a heart, and/or a lung, may be used. A method in which the three-dimensional organ image 42 is extracted using the unique identifier is merely an example, and a method in which the three-dimensional organ image 42 designated by the user 18 using any means through the reception device 14 is extracted by the extraction unit 24A may be used, or a method in which the three-dimensional organ image 42 is extracted by the extraction unit 24A using image recognition processing, such as an artificial intelligence (AI) system and/or a pattern matching system, may be used. The three-dimensional organ image 42 is not limited to an image showing a single organ. For example, an image in which, in addition to a pancreas, a plurality of organs, such as a blood vessel, a bile duct, or a spleen adjacent to the pancreas, may be used.

Figure 4:
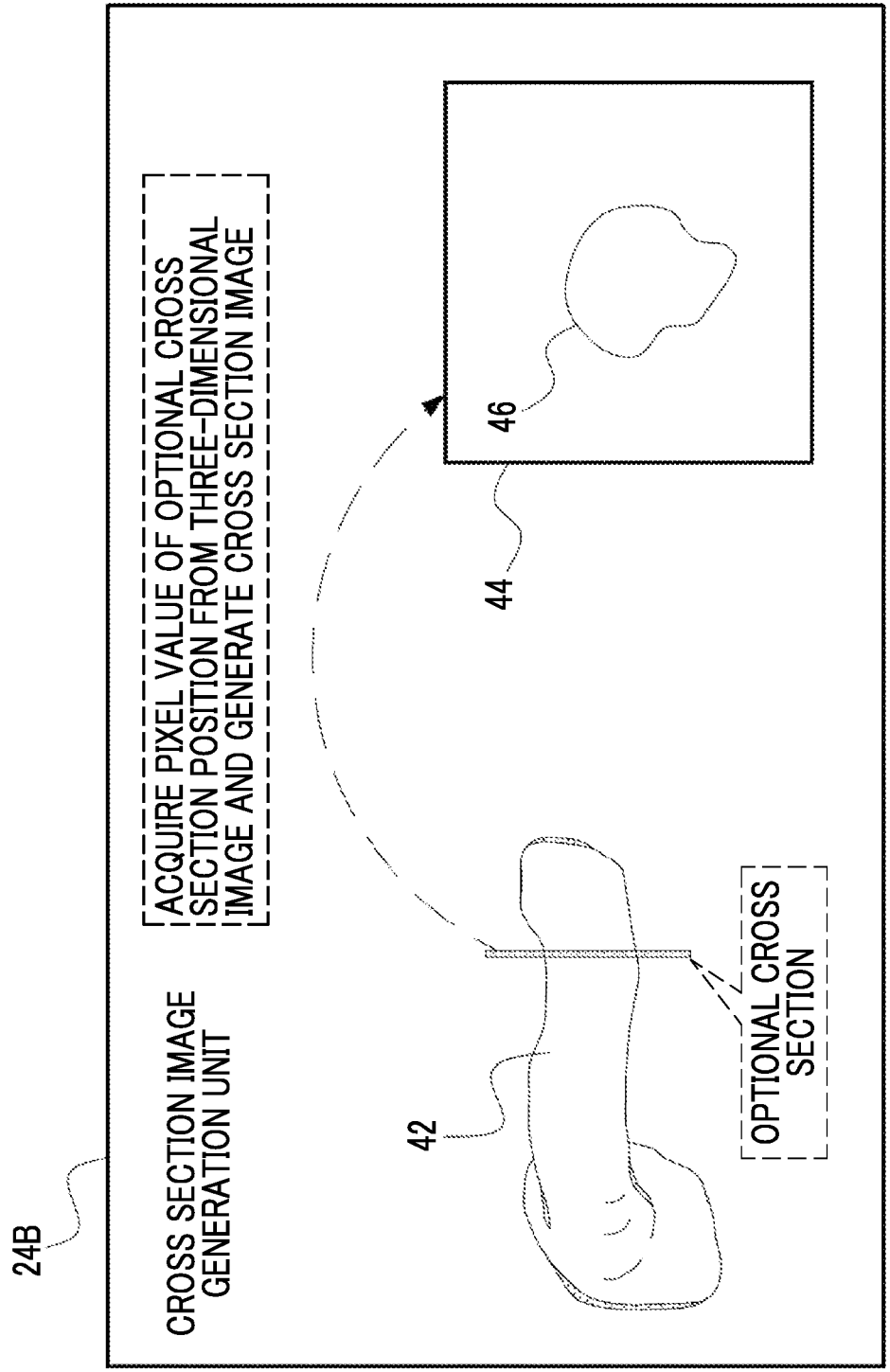
FIG. 4 is a conceptual diagram showing an example of processing contents of a cross section image generation unit.

As shown in FIG. 4 as an example, the cross section image generation unit 24B generates a cross section image 46 from the three-dimensional organ image 42. The cross section image 46 indicates an image in which the three-dimensional organ image 42 is viewed in a cross section. The cross section image generation unit 24B acquires each pixel (that is, a voxel) in the three-dimensional organ image 42 in any designated cross section. The cross section image generation unit 24B generates the cross section image 46 from pixel values in any cross section of the three-dimensional organ image 42. A position of any cross section of the three-dimensional organ image 42 is changed, for example, in response to an instruction received by the reception device 14, and accordingly, the cross section images 46 in a case where the three-dimensional organ image 42 is observed in a cross section from various directions are generated. The cross section image 46 is displayed, for example, on the display device 16 or is stored in a predetermined storage device (for example, the storage 26). The cross section image 46 is an example of a "two-dimensional image" according to the technique of the present disclosure. Although the cross section image 46 is generated from the three-dimensional organ image 42, the technique of the present disclosure is not limited thereto, and the cross section image 46 may be generated from the three-dimensional image 38.

Figure 5:
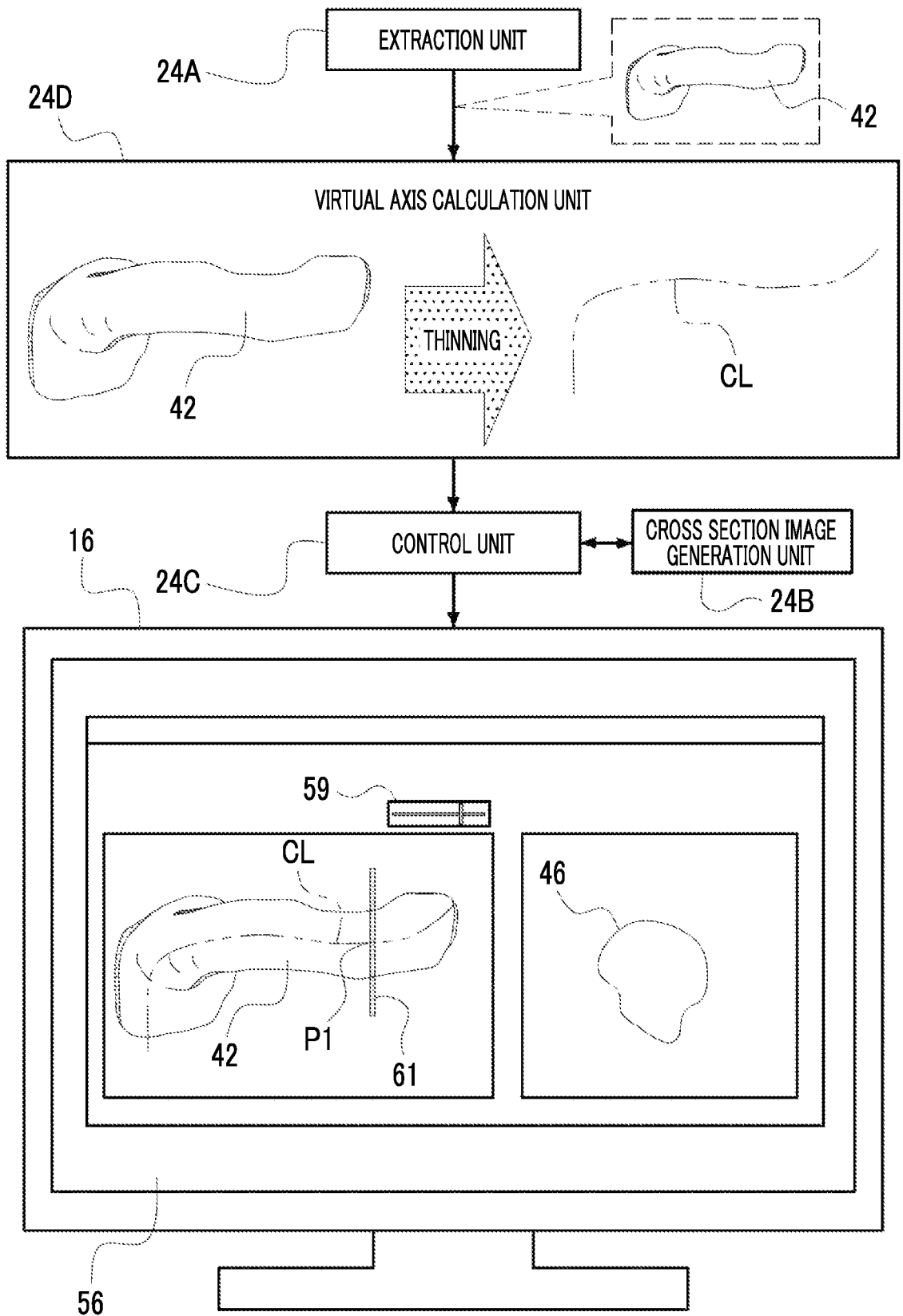
FIG. 5 is a conceptual diagram showing an example of an aspect where a first cross section is displayed on a display device.

As shown in FIG. 5 as an example, the virtual axis calculation unit 24D acquires the three-dimensional organ image 42 from the extraction unit 24A. The virtual axis calculation unit 24D calculates a central axis CL in the three-dimensional organ image 42 based on the three-dimensional organ image 42. Specifically, the virtual axis calculation unit 24D calculates the central axis CL by executing thinning processing on the three-dimensional organ image 42. The central axis CL is an example of a "virtual axis" according to the technique of the present disclosure.

The control unit 24C acquires the central axis CL from the virtual axis calculation unit 24D. The control unit 24C specifies a geometrical characteristic of a first cross section 61 on the central axis CL and outputs the specified geometrical characteristic to the cross section image generation unit 24B. The geometrical characteristic of the first cross section 61 on the central axis CL indicates, for example, a first position P1 that is a position of the first cross section 61 on the central axis CL and a posture of the first cross section 61. The posture of the first cross section 61 indicates, for example, an inclination of the first cross section 61 with respect to the central axis CL. The first position P1 may be, for example, a position set in advance on the central axis CL or may be a position of the central axis CL received by the reception device 14.

The cross section image generation unit 24B generates a cross section image 46 corresponding to the first cross section 61. The cross section image 46 corresponding to the first cross section 61 indicates an image in which the three-dimensional organ image 42 is viewed in a cross section along the first cross section 61 (that is, a two-dimensional image showing a cut section in a case where the three-dimensional organ image 42 is cut along the first cross section 61). The control unit 24C acquires the cross section image 46 corresponding to the first cross section 61 from the cross section image generation unit 24B. The control unit 24C outputs information for displaying the three-dimensional organ image 42, the cross section image 46 corresponding to the first cross section 61, and the first cross section 61 on the display device 16. Specifically, the control unit 24C performs graphical user interface (GUI) control for displaying the three-dimensional organ image 42, the first cross section 61, and the cross section image 46 corresponding to the first cross section 61 to display a screen 56 on the display device 16.

On the screen 56, the three-dimensional organ image 42 in a state in which the first cross section 61 is inserted, and the cross section image 46 corresponding to the first cross section 61 are displayed. The three-dimensional organ image 42 in a state in which the first cross section 61 is inserted indicates the three-dimensional organ image 42 in a state in which the first cross section 61 is inserted at the first position P1. On the screen 56, the three-dimensional organ image 42 and the cross section image 46 are displayed in an arranged state. In the example shown in FIG. 5, although the three-dimensional organ image 42 and the cross section image 46 are displayed in a horizontally arranged state, this is merely an example, and the three-dimensional organ image 42 and the cross section image 46 may be displayed in a vertically arranged state. On the display device 16, a slider 59 is displayed under the control of the control unit 24C.

Figure 6:
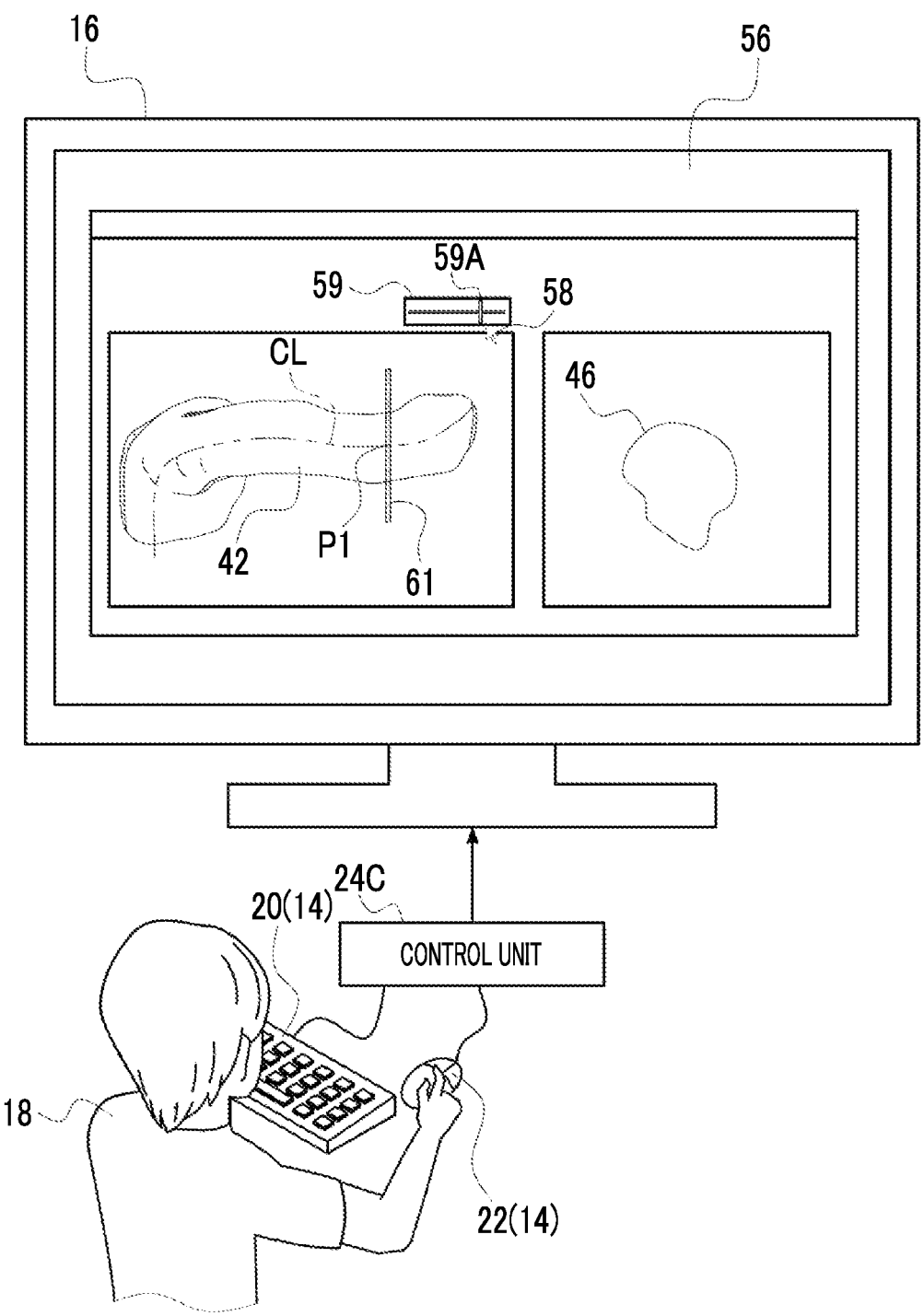
FIG. 6 is a conceptual diagram showing an example of an aspect where a change instruction of a geometrical characteristic of the first cross section is received.

As shown in FIG. 6 as an example, a pointer 58 is displayed on the screen 56 under the control of the control unit 24C. In the slider 59, a thumb 59A is slidably provided. The user 18 operates the pointer 58 through the reception device 14 (here, the mouse 22 as an example), thereby giving a thumb position change instruction to the control unit 24C. The thumb position change instruction indicates an instruction to change a position of the thumb 59A on the slider 59. Here, the position of the thumb 59A on the slider 59 corresponds to the position of the first cross section 61 on the central axis CL, and a distance at which the thumb 59A is operable corresponds to a length of the central axis CL. The control unit 24C changes the position of the thumb 59A on the slider 59 within the screen 56 in response to the thumb position change instruction given by the user 18 through the reception device 14.

Figure 7:
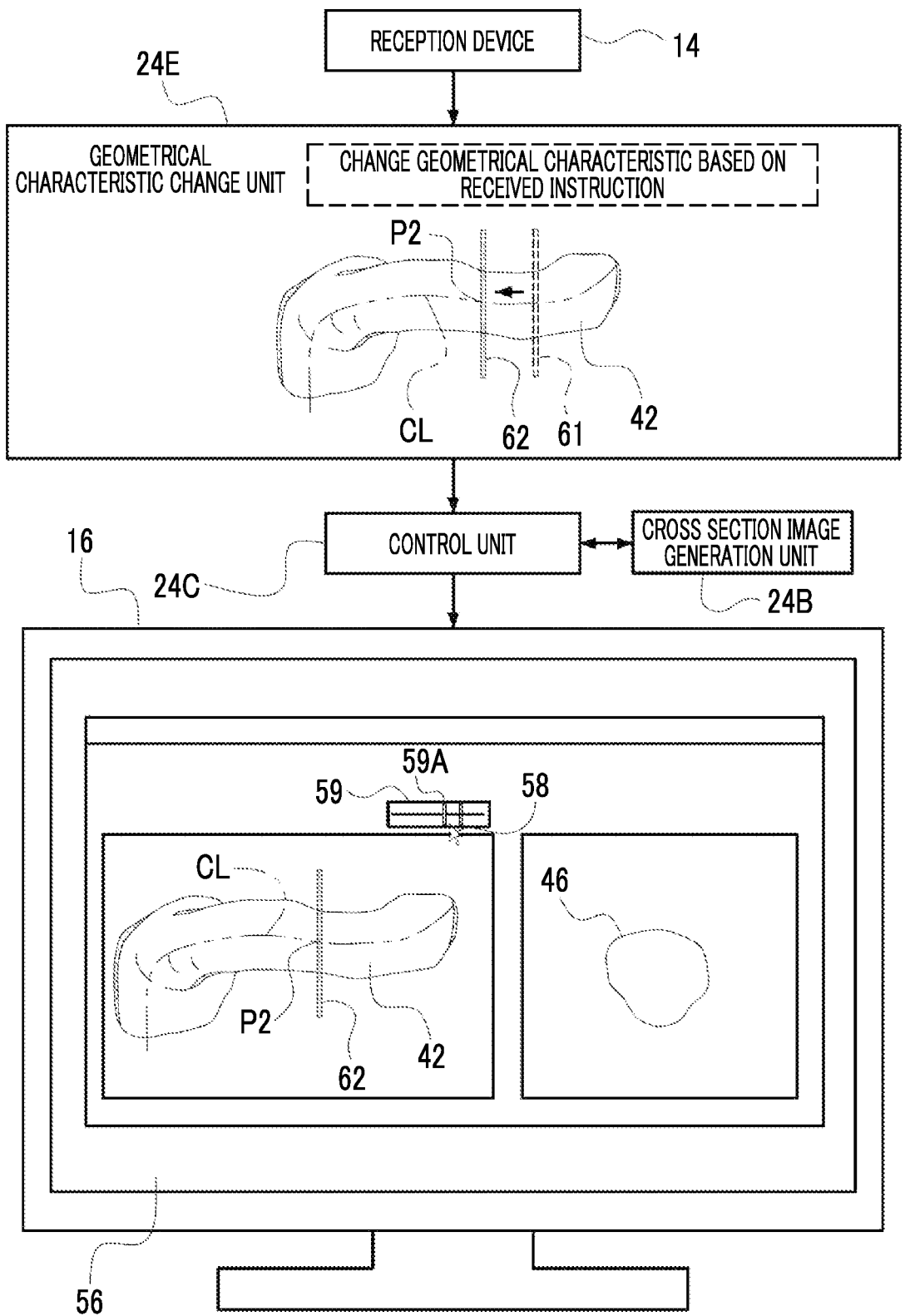
FIG. 7 is a conceptual diagram showing an example of an aspect where a second cross section is displayed on the display device.

As shown in FIG. 7 as an example, the geometrical characteristic change unit 24E acquires the thumb position change instruction received by the reception device 14. The geometrical characteristic change unit 24E changes the first position P1 (that is, the position of the first cross section 61 on the central axis CL) as the geometrical characteristic of the first cross section 61 to a second position P2 in response to the thumb position change instruction. Changing from the first position P1 to the second position P2 means sliding the first cross section 61 from the first position P1 to the second position P2 along the central axis CL.

In this way, in a case of sliding the first cross section 61 from the first position P1 to the second position P2 along the central axis CL, the geometrical characteristic change unit 24E calculates a position of a second cross section 62 on the central axis CL based on a movement amount of the thumb 59A on the slider 59 and the position of the first cross section 61 as a cross section before the change on the central axis CL. Here, the second cross section 62 indicates a cross section (that is, a cross section obtained by changing the first cross section 61 in response to the thumb position change instruction) after the change of the first cross section 61. Hereinafter, for convenience of description, in a case where there is no need for distinction between the first cross section 61 and the second cross section 62, the first cross section 61 and the second cross section 62 are simply referred to as the "cross section" without reference numerals.

The geometrical characteristic change unit 24E specifies the calculated geometrical characteristic of the second cross section 62 on the central axis CL and outputs the specified geometrical characteristic to the control unit 24C. The geometrical characteristic of the second cross section 62 on the central axis CL indicates, for example, the second position P2 (that is, a position of the second cross section 62 on the central axis CL) and a posture of the second cross section 62. The posture of the second cross section 62 indicates, for example, an inclination of the second cross section 62 with respect to the central axis CL.

The control unit 24C acquires the geometrical characteristic of the second cross section 62 from the geometrical characteristic change unit 24E. The control unit 24C outputs the geometrical characteristic of the second cross section 62 to the cross section image generation unit 24B. The cross section image generation unit 24B generates a cross section image 46 corresponding to the second cross section 62. The cross section image 46 corresponding to the second cross section 62 indicates an image in which the three-dimensional organ image 42 is viewed in a cross section along the second cross section 62 (that is, a two-dimensional image showing a cut section in a case where the three-dimensional organ image 42 is cut along the second cross section 62). The control unit 24C acquires the cross section image 46 corresponding to the second cross section 62 from the cross section image generation unit 24B. The control unit 24C outputs information for displaying the three-dimensional organ image 42, the cross section image 46 corresponding to the second cross section 62, and the second cross section 62 on the display device 16.

Specifically, the control unit 24C performs display control for displaying the three-dimensional organ image 42, the second cross section 62, and the cross section image 46 corresponding to the second cross section 62 to update display contents of the screen 56. That is, on the screen 56, the three-dimensional organ image 42 in a state in which the first cross section 61 is inserted is updated to the three-dimensional organ image 42 in a state in which the second cross section 62 is inserted, and the cross section image 46 corresponding to the first cross section 61 is updated to the cross section image 46 corresponding to the second cross section 62. The three-dimensional organ image 42 in a state in which the second cross section 62 is inserted indicates the three-dimensional organ image 42 in a state in which the first cross section 61 is inserted at the second position P2.

Figure 8:
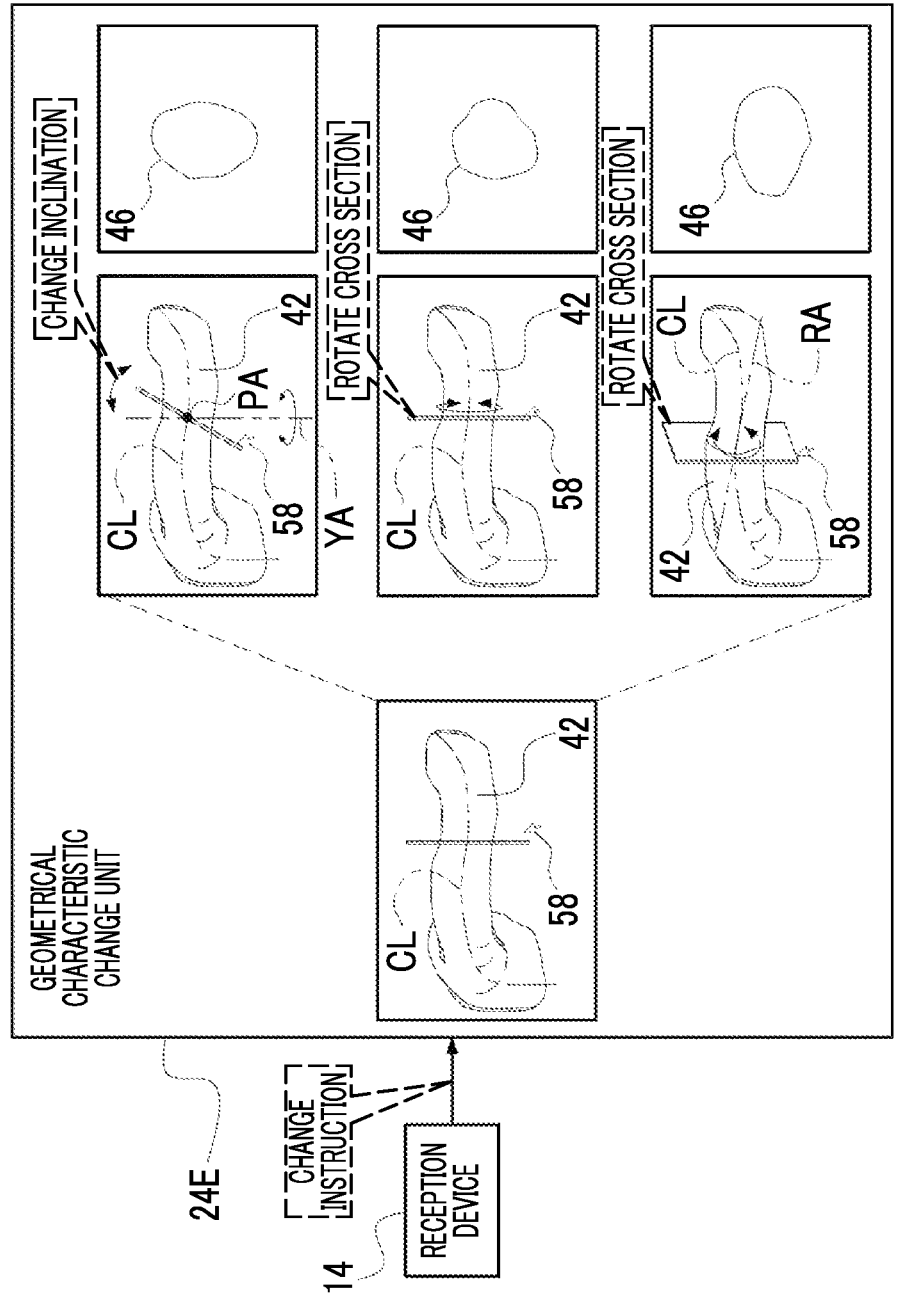
FIG. 8 is a conceptual diagram showing an example of an aspect of changing a geometrical characteristic.

In a case of changing a geometrical characteristic of a cross section, as shown in FIG. 8 as an example, the user 18 can operate the cross section with the pointer 58. For example, the pointer 58 is operated in response to an instruction received by the reception device 14, whereby the cross section is dragged. The cross section is dragged in this way, whereby a position of the cross section along the central axis CL is changed or a posture of the cross section is changed. The change of the posture of the cross section is realized by, for example, change of an inclination of the cross section, rotation of the cross section with the central axis CL as a rotation axis, and/or rotation of the cross section with an axis RA as a rotation axis. Hereinafter, for convenience of description, an instruction to change a geometrical characteristic including the thumb position change instruction and an instruction for the cross section by a drag operation is referred to as a "change instruction".

As shown at an upper right end of FIG. 8 as an example, the geometrical characteristic change unit 24E changes an inclination of the cross section with respect to the central axis CL as a geometrical characteristic in response to a change instruction received by the reception device 14. The inclination with respect to the central axis CL may be an inclination around a pitch axis PA supposed in a case where the central axis CL is assumed as a roll axis or may be an inclination of a yaw axis YA supposed in a case where the central axis CL is assumed as a roll axis.

The geometrical characteristic change unit 24E rotates the cross section with the central axis CL as a rotation axis in response to a change instruction received by the reception device 14. In this case, as shown at a middle right end of FIG. 8 as an example, the geometrical characteristic change unit 24E changes a rotation position of the cross section as a geometrical characteristic by rotating the cross section with the central axis CL as a rotation axis.

The geometrical characteristic change unit 24E rotates the cross section with an axis other than the central axis CL as a rotation axis in response to a change instruction received by the reception device 14. In this case, as shown at a lower right end of FIG. 8 as an example, the geometrical characteristic change unit 24E may change a rotation position of the cross section as a geometrical characteristic by rotating the first cross section 61 with the axis RA crossing the central axis CL and following a normal direction of the first cross section 61 as a rotation axis.

Next, the operation of the medical service support device 10 will be described with reference to FIG. 9.

First, an example of a flow of image processing that is executed by the processor 24 of the medical service support device 10 will be described with reference to FIG. 9. The flow of the image processing shown in FIG. 9 is an example of an "image processing method" according to the technique of the present disclosure.

Figure 9:
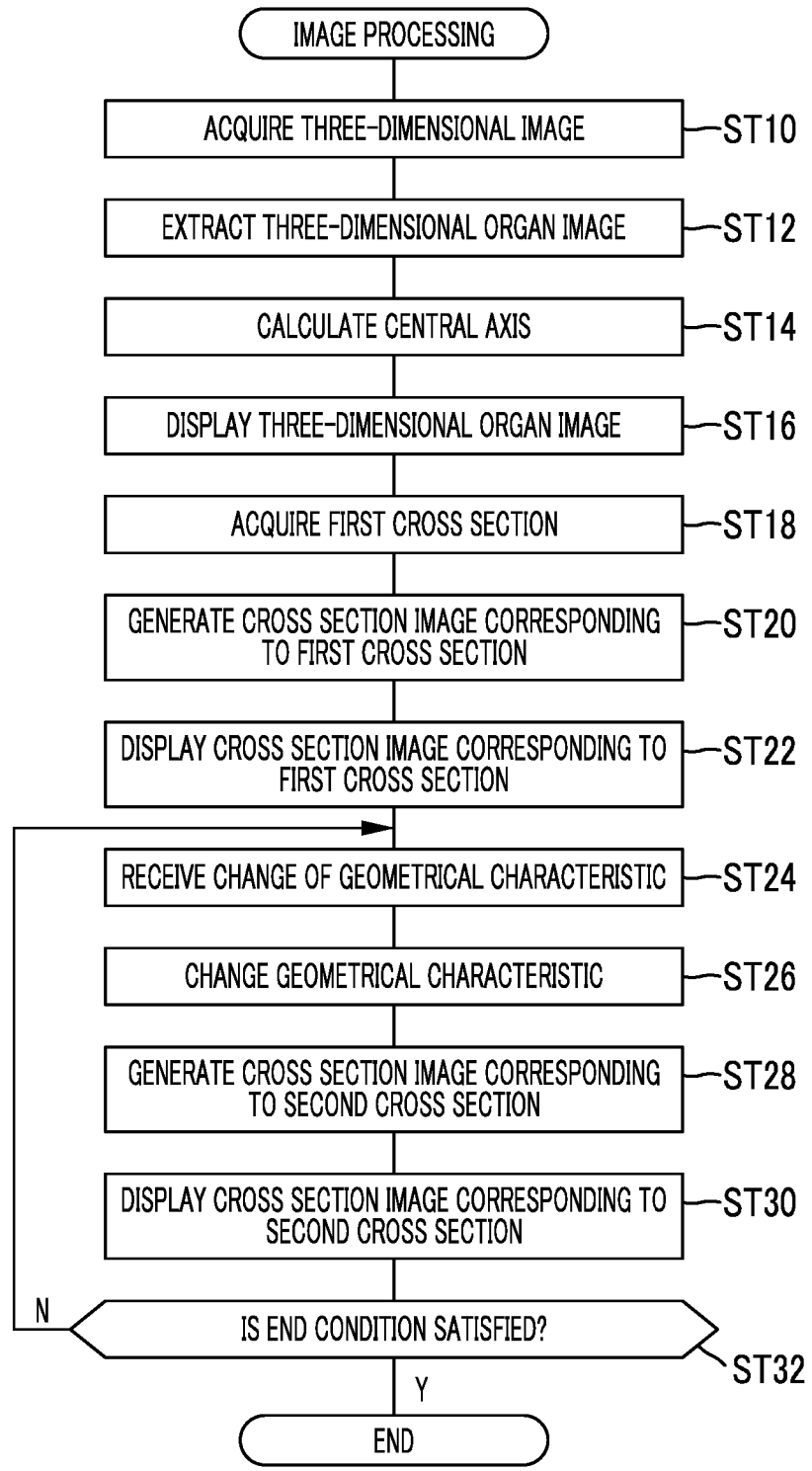
FIG. 9 is a flowchart illustrating an example of a flow of image processing.

In the image processing shown in FIG. 9, first, in Step ST10, the extraction unit 24A acquires the three-dimensional image 38 from the storage 26. After the processing of Step ST10 is executed, the image processing proceeds to Step ST12.

In Step ST12, the extraction unit 24A extracts the three-dimensional organ image 42 from the three-dimensional image 38 acquired in Step ST10. After the processing of Step ST12 is executed, the image processing proceeds to Step ST14.

In Step ST14, the virtual axis calculation unit 24D calculates the central axis CL of the three-dimensional organ image 42 extracted in Step ST12. After the processing of Step ST14 is executed, the image processing proceeds to Step ST16.

In Step ST16, the control unit 24C displays the three-dimensional organ image 42 extracted in Step ST12 on the display device 16. After the processing of Step ST16 is executed, the image processing proceeds to Step ST18.

In Step ST18, the control unit 24C acquires the first cross section 61 on the central axis CL through the reception device 14. After the processing of Step ST18 is executed, the image processing proceeds to Step ST20.

In Step ST20, the cross section image generation unit 24B generates the cross section image 46 corresponding to the first cross section 61 based on the geometrical characteristic of the first cross section 61 acquired from the control unit 24C. After the processing of Step ST20 is executed, the image processing proceeds to Step ST22.

In Step ST22, the control unit 24C displays the cross section image 46 (that is, the cross section image 46 corresponding to the first cross section 61) generated in Step ST20 on the display device 16. After the processing of Step ST22 is executed, the image processing proceeds to Step ST24.

In Step ST24, the geometrical characteristic change unit 24E acquires the change instruction (for example, the thumb position change instruction or the instruction for the cross section by a drag operation) of the position of the first cross section 61 on the central axis CL through the reception device 14. After the processing of Step ST24 is executed, the image processing proceeds to Step ST26.

In Step ST26, the geometrical characteristic change unit 24E changes the geometrical characteristic of the first cross section 61 based on the change instruction acquired in Step ST24 to acquire the second cross section 62. After the processing of Step ST26 is executed, the image processing proceeds to Step ST28.

In Step ST28, the cross section image generation unit 24B generates the cross section image 46 corresponding to the second cross section 62 acquired in Step ST26. After the processing of Step ST28 is executed, the image processing proceeds to Step ST30.

In Step ST30, the control unit 24C displays the cross section image 46 corresponding to the second cross section 62 generated in Step ST28 on the display device 16. After the processing of Step ST30 is executed, the image processing proceeds to Step ST32.

In Step ST32, the geometrical characteristic change unit 24E determines whether or not a condition (hereinafter, referred to as an "end condition") for ending the image processing is satisfied. An example of the end condition is a condition that an instruction to end the image processing is received by the reception device 14. In Step ST32, in a case where the end condition is not satisfied, determination is made to be negative, and the image processing proceeds to Step ST24. In Step ST32, in a case where the end condition is satisfied, determination is made to be affirmative, and the image processing ends.

As described above, in the medical service support device 10 according to the first embodiment, the three-dimensional organ image 42 is displayed on the display device 16, and the central axis CL of a target organ in the three-dimensional organ image 42 is calculated. The cross section image 46 corresponding to the first cross section 61 crossing the central axis CL is displayed on the display device 16. Then, the cross section image 46 corresponding to the second cross section 62 having the geometrical characteristic changed in response to the instruction to change the geometrical characteristic of the first cross section 61 is displayed on the display device 16. Accordingly, it is possible to simply and easily search for a cross section in the target organ without using the central axis CL in the three-dimensional organ image 42, compared to a case where a geometrical characteristic of a cross section cannot be changed.

In the medical service support device 10 according to the first embodiment, at least one of the position of the first cross section 61 on the central axis CL or the inclination of the first cross section 61 with respect to the central axis CL as the geometrical characteristic of the cross section can be changed. Accordingly, it is possible to simply and easily search for a cross section in the target organ compared to a case where the position of the first cross section 61 on the central axis CL and the inclination of the first cross section 61 with respect to the central axis CL cannot be changed.

In the medical service support device 10 according to the first embodiment, the position of the first cross section 61 on the central axis CL as the geometrical characteristic of the cross section is at least one of a position of the first cross section 61 in an axial direction of the central axis CL, a position in a case where the first cross section 61 is rotated with the central axis CL as a rotation axis, and a position in a case where the first cross section 61 is rotated with the axis RA crossing the central axis CL and following the normal direction of the first cross section 61 as a rotation axis. Accordingly, it is possible to simply and easily search for a cross section in the target organ compared to a case where the position of the first cross section 61 in the axial direction of the central axis CL cannot be changed, the first cross section 61 cannot be rotated with the central axis CL as a rotation axis, or the first cross section 61 cannot be rotated with the axis RA as a rotation axis.

In the medical service support device 10 according to the first embodiment, since the central axis CL is used as the virtual axis of the target organ, it is possible to bring a position where the target organ is displayed in the first cross section 61 and in the second cross section 62 close to the center of the cross section compared to a case where the virtual axis is not the central axis CL.

In the medical service support device 10 according to the first embodiment, since the image processing is executed on the three-dimensional organ image 42 showing an organ as the target part, search for a cross section for an organ is realized. In particular, in the medical service support device 10, since the image processing is executed on the three-dimensional organ image 42 showing a pancreas as the target organ, search for a cross section for a pancreas is realized.

Second Embodiment

In a second embodiment, a case where a region corresponding to a lesion part (for example, a tumor) in a target organ is specified, and the region corresponding to the lesion part is displayed along with the three-dimensional organ image 42 and the cross section image 46 will be described.

Figure 10:
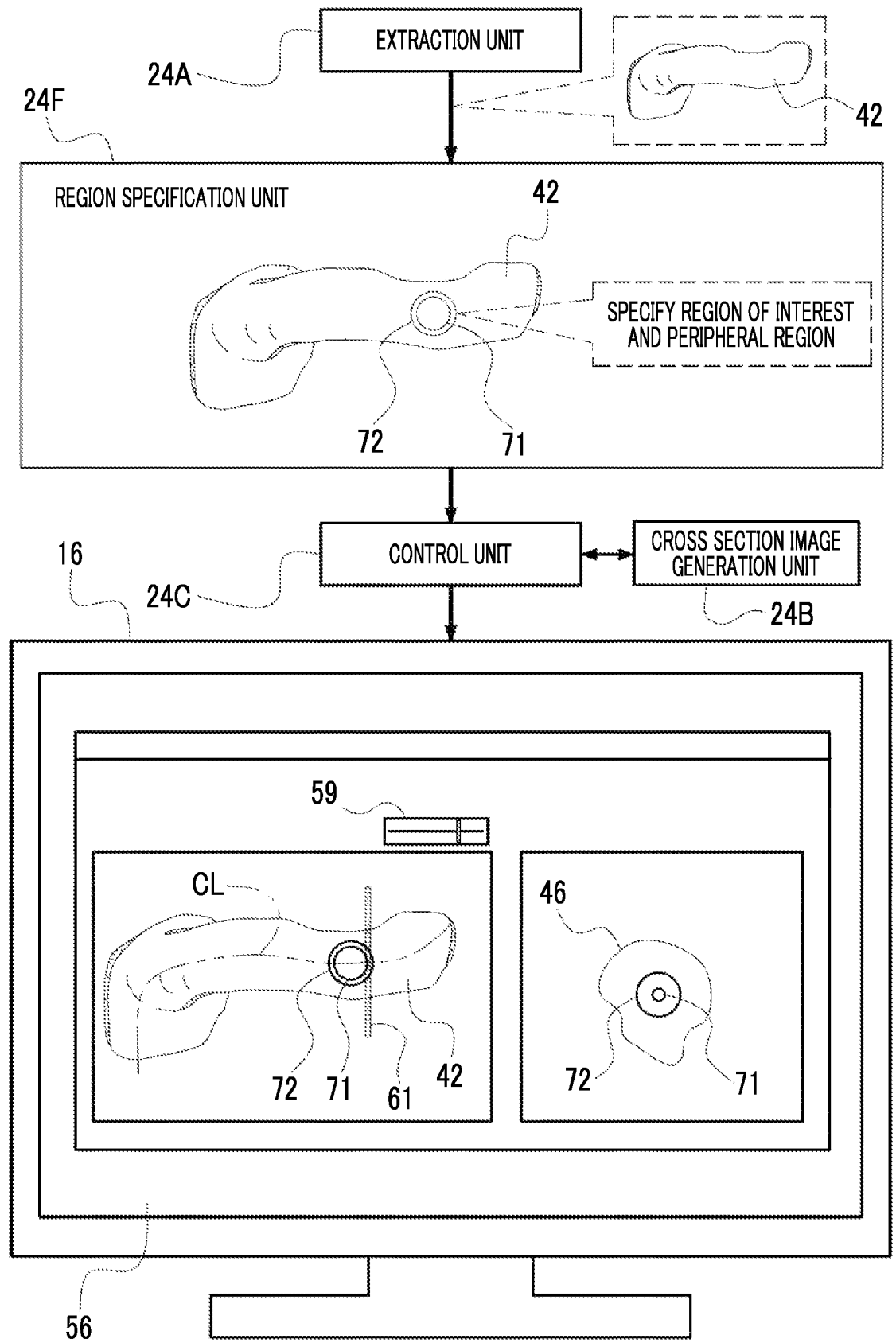
FIG. 10 is a conceptual diagram showing an example of an aspect where a region of interest and a peripheral region are displayed on the display device.

As shown in FIG. 10 as an example, first, the region specification unit 24F acquires the three-dimensional organ image 42 from the extraction unit 24A and specifies a region of interest 71 corresponding to a lesion part from the acquired three-dimensional organ image 42. Specifically, the region specification unit 24F executes image recognition processing on the three-dimensional organ image 42 and extracts a region having a voxel value satisfying a condition set in advance, as the region of interest 71. The image recognition processing is not particularly limited, and, for example, a method in which a region of interest is extracted using image recognition processing by an AI system and/or a pattern matching system is used. The region specification unit 24F specifies a region in a range at a designated distance from the region of interest 71, as a peripheral region 72. Specifically, the region specification unit 24F extracts a region extended from the region of interest 71 extracted from the three-dimensional organ image 42 by a distance set in advance or by a distance received by the reception device 14, as the peripheral region 72. The region specification unit 24F outputs positional information of the specified region of interest 71 and the peripheral region 72 to the control unit 24C. The positional information of the region of interest 71 and the peripheral region 72 is information (for example, three-dimensional coordinates) indicating ranges of the region of interest 71 and the peripheral region 72 in the three-dimensional organ image 42.

The control unit 24C acquires the positional information of the region of interest 71 and the peripheral region 72 from the region specification unit 24F. The control unit 24C outputs the positional information of the region of interest 71 and the peripheral region 72, and the geometrical characteristic of the first cross section 61 to the cross section image generation unit 24B.

The cross section image generation unit 24B generates a cross section image 46 corresponding to the first cross section 61. The cross section image generation unit 24B generates the cross section image 46 including the region of interest 71 in a case where the region of interest 71 crosses the first cross section 61.

The control unit 24C outputs information for displaying the cross section image 46 acquired from the cross section image generation unit 24B on the display device 16. Specifically, the control unit 24C performs display control such that the display device 16 displays the three-dimensional organ image 42, the first cross section 61, the cross section image 46 corresponding to the first cross section 61, and the region of interest 71 and the peripheral region 72 on the screen 56.

As shown in FIG. 11 as an example, on the screen 56, the three-dimensional organ image 42 in a state in which the first cross section 61 is inserted and the region of interest 71 and the peripheral region 72 are displayed, and the cross section image 46 corresponding to the first cross section 61 are displayed. In a case where the first cross section 61 crosses the region of interest 71 and the peripheral region 72, the region of interest 71 and the peripheral region 72 are displayed in the cross section image 46.

In a case where the first cross section 61 crosses the region of interest 71 or the peripheral region 72, the control unit 24C displays a message for the user 18 on the display device 16. A notification message region 56A is included in the screen 56. A notification message 56A1 is displayed in the notification message region 56A. The notification message 56A1 is a message "Region of interest is included in cross section" as shown in FIG. 11 as an example. The user 18 operates the pointer 58 through the reception device 14 (here, as an example, the mouse 22) to change the position of the thumb 59A on the slider 59 and to search for a cross section not crossing the region of interest 71 or the peripheral region 72. The display device 16 is an example of a "notification device" according to the technique of the present disclosure.

As described above, in the medical service support device 10 according to the second embodiment, since the region of interest 71 showing the lesion part is specified in the three-dimensional organ image 42, it is possible to search for a cross section after ascertaining a positional relationship with the lesion part.

In the medical service support device 10 according to the second embodiment, the region of interest 71 is specified in the three-dimensional organ image 42, and the region in the designated region from the region of interest 71 is specified as the peripheral region 72. Accordingly, the region of interest 71 is easily visually recognized by the user 18 compared to a case where the peripheral region 72 is not specified.

In the medical service support device 10 according to the second embodiment, in a case where the peripheral region 72 crosses at least one of the first cross section 61 or the second cross section 62, the display device 16 performs notification to the user 18 by displaying the notification message 56A1. Accordingly, the user 18 easily recognizes that the peripheral region 72 crosses the cross section, compared to a case where notification is not performed even though the peripheral region 72 crosses the cross section.

In the second embodiment described above, although a form example where the region of interest 71 is specified using the image recognition processing has been described, the technique of the present disclosure is not limited thereto. For example, a table in which information regarding a form of the region of interest 71 is associated with each identifier of the three-dimensional organ image 42 may be read out to specify the region of interest 71. The user 18 may have means for specifying the region of interest 71. Specifically, information for displaying at least one of the three-dimensional image 38, the three-dimensional organ image 42, and a plurality of two-dimensional slice images 40 on the display device 16 may be output, and an input to designate a boundary of the region of interest 71 for the displayed image may be received in the reception device 14.

In the second embodiment described above, although a form example where the display device 16 displays the notification message 56A1 to perform notification to the user 18 has been described, notification by voice through a speaker (not shown), or the like may be performed.

In the second embodiment described above, although a form example where the peripheral region 72 is displayed around the region of interest 71 has been described, the technique of the present disclosure is not limited thereto. For example, the region of interest 71 may be easily visually recognized by the user 18 by changing the color, brightness, or the like of the region of interest 71 itself.

Third Embodiment

In a third embodiment, a case where the region of interest 71 is specified in the three-dimensional organ image 42, the three-dimensional organ image 42 is divided in a designated cross section, and only one of the three-dimensional organ images 42 after division is displayed will be described.

Figure 12:
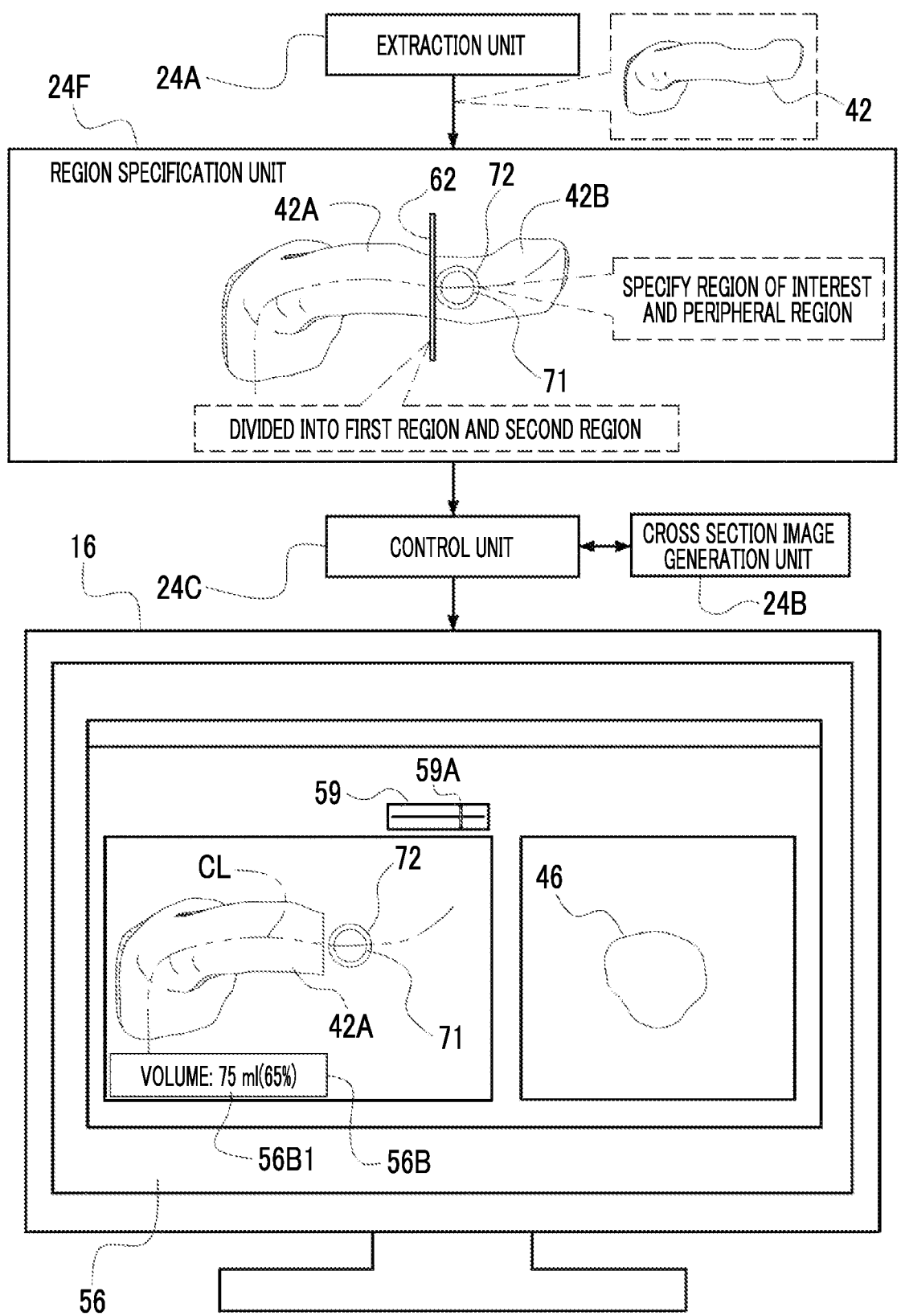
FIG. 12 is a conceptual diagram showing an example of an aspect where only a first region after division is displayed on the display device.

As shown in FIG. 12 as an example, the region specification unit 24F acquires the three-dimensional organ image 42 from the extraction unit 24A, and the region of interest 71 and the peripheral region 72 are specified in the three-dimensional organ image 42. The region specification unit 24F calculates the geometrical characteristic of the second cross section 62 based on the change instruction received through the reception device 14. The region specification unit 24F divides the three-dimensional organ image 42 into a first region 42A and a second region 42B based on the geometrical characteristic of the second cross section 62. Specifically, the region specification unit 24F divides the three-dimensional organ image 42 into the first region 42A and the second region 42B as separate regions with the second cross section 62 interposed therebetween, and gives an identifier to each of the first region 42A and the second region 42B. As shown in FIG. 12 as an example, the first region 42A is a region not including the region of interest 71 and the peripheral region 72, and the second region 42B is a region including the region of interest 71 and the peripheral region 72.

The control unit 24C acquires a three-dimensional organ image 42 of each of the first region 42A and the second region 42B from the region specification unit 24F. The control unit 24C acquires a selection result of the user 18 regarding which of the first region 42A and the second region 42B of the three-dimensional organ image 42 after division is displayed, through the reception device 14. As an example, the user 18 operates the pointer 58 through the reception device 14 (here, as an example, the mouse 22) to designate a region to be displayed. The control unit 24C outputs information for displaying the three-dimensional organ image 42 showing only a region designated by the user 18 between the first region 42A and the second region 42B on the display device 16. Specifically, the control unit 24C performs display control such that the display device 16 displays the three-dimensional organ image 42 showing only one of the first region 42A or the second region 42B, the second cross section 62, and the cross section image 46 corresponding to the second cross section 62 on the screen 56.

In the example shown in FIG. 12, an example where the three-dimensional organ image 42 showing the first region 42A that is a region not including the region of interest 71 is displayed on the screen 56 is shown. On the screen 56, the region of interest 71 and the peripheral region 72 are displayed. That is, the positions of the region of interest 71 and the peripheral region 72 in the second region 42B, which is a region where the region of interest 71 not displayed on the screen 56 is not included, are displayed on the screen 56.

A volume display region 56B is included in the screen 56. A calculation result 56B1 is displayed in the volume display region 56B. The calculation result 56B1 shows a volume of the first region 42A and a ratio of the volume of the first region 42A to a volume of a target organ before division. Specifically, the control unit 24C calculates the volume of the entire target organ based on the three-dimensional organ image 42. The control unit 24C calculates the volume of the first region 42A based on the three-dimensional organ image 42 that displays only the first region 42A. The control unit 24C calculates a ratio of the volume of the first region 42A in the entire organ based on the volume of the first region 42A and on the volume of the entire target organ.

The control unit 24C performs display control such that the display device 16 displays the calculation result 56B1 in the volume display region 56B in the screen 56. In the example shown in FIG. 12, "volume: 75 ml (65%)" is shown as an example of the calculation result 56B1.

In the third embodiment described above, although a form example where the first region 42A is displayed has been described, the technique of the present disclosure is not limited thereto. Only the second region 42B may be displayed, or the first region 42A and the second region 42B on the screen 56 may be switched and displayed by selection of the user 18.

In the third embodiment described above, although a form example where a region designated by the user 18 between the first region 42A and the second region 42B is displayed on the screen 56 has been described, the technique of the present disclosure is not limited thereto. For example, the control unit 24C may display any one of the first region 42A or the second region 42B on the display device 16 based on the positional information of the region of interest 71 acquired from the region specification unit 24F. Specifically, the control unit 24C determines which of the first region 42A and the second region 42B includes the region of interest 71, based on the positional information of the region of interest 71. The control unit 24C outputs the three-dimensional organ image 42 showing only the region where the region of interest 71 is not included, to the display device 16 based on a determination result. With this, the display device 16 displays the three-dimensional organ image 42 on the screen 56.

As described above, in the medical service support device 10 according to the third embodiment, since the three-dimensional organ image 42 is divided into the first region 42A and the second region 42B along the designated second cross section 62, display in a state in which an organ is cut along the second cross section 62 is realized.

In the medical service support device 10 according to the third embodiment, any one of the first region 42A or the second region 42B is displayed on the display device 16. Accordingly, with this configuration, after the organ is cut along the second cross section 62, display in a state in which only one of the first region 42A or the second region 42B remains is realized.

In the medical service support device 10 according to the third embodiment, the region of interest 71 is specified in the three-dimensional organ image 42, and the region where the region of interest 71 is not included, between the first region 42A and the second region 42B, is displayed on the display device 16. Accordingly, with this configuration, display in a state in which the region where the region of interest 71 is not included, between the first region 42A and the second region 42B, remains is realized.

Fourth Embodiment

In a fourth embodiment, a case where the change instruction received through the reception device 14 is restricted based on information regarding the target organ shown in the three-dimensional organ image 42 will be described.

Figure 13:
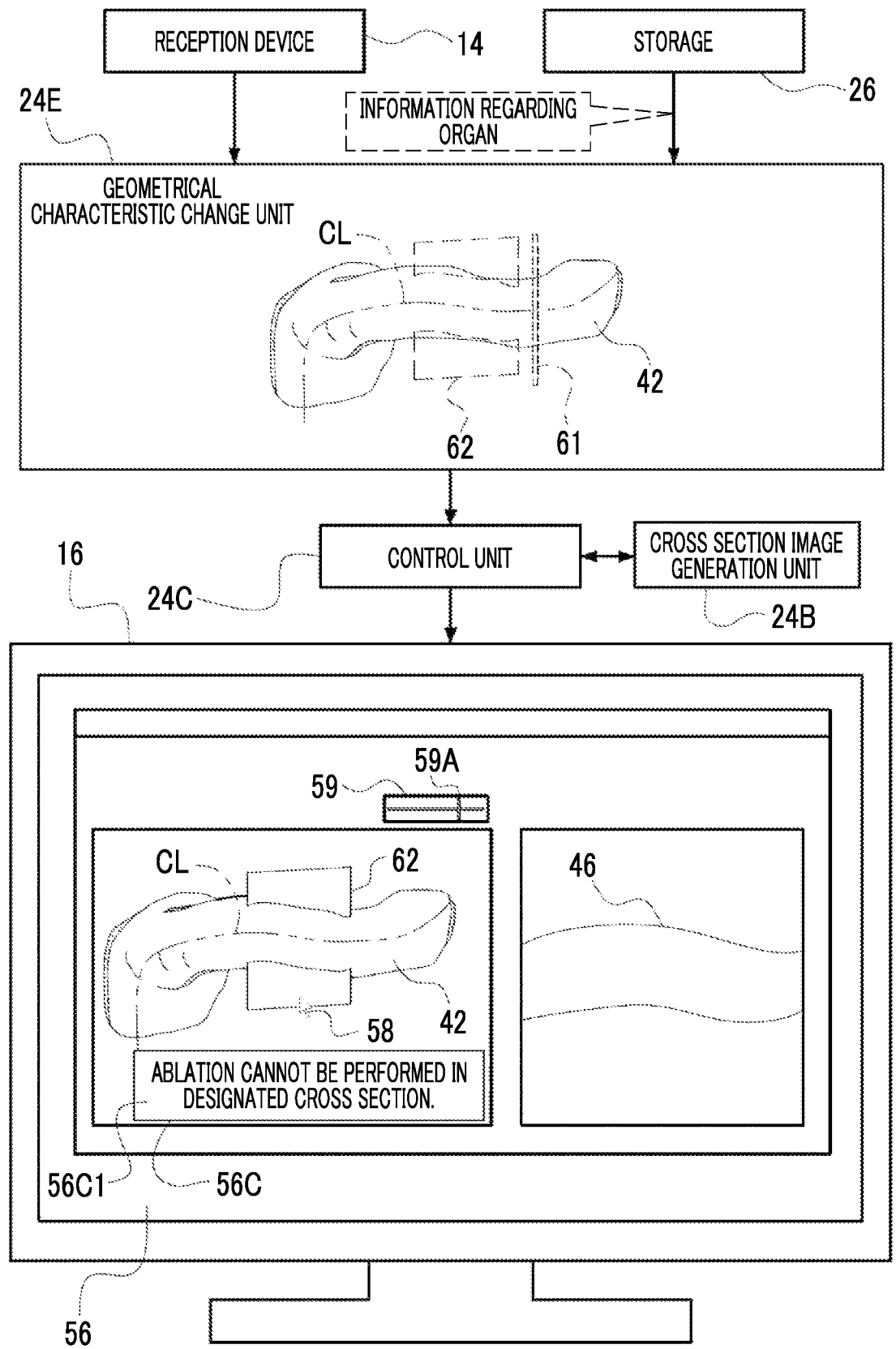
FIG. 13 is a conceptual diagram showing an example of an aspect where the change instruction of the geometrical characteristic is restricted.

As shown in FIG. 13 as an example, the geometrical characteristic change unit 24E acquires the change instruction of the geometrical characteristic of the first cross section 61 received through the reception device 14. The geometrical characteristic change unit 24E changes the geometrical characteristic of the first cross section 61 based on the acquired change instruction. The geometrical characteristic change unit 24E acquires information regarding an organ from the storage 26. Information regarding the organ is information regarding an operation of the organ as an example. More specifically, information regarding the organ is a table of a geometrical characteristic of a cross section in which ablation is not possible in an operation, associated with a type of an organ. For example, in a case where the organ is a pancreas, an operation may be performed in a laparoscope. In a laparoscopic operation, it is difficult to ablate the pancreas in a cross section along a direction (for example, a longitudinal direction of a pancreatic duct of the pancreas) in which it is difficult for an operation tool to be brought close to the pancreas. Accordingly, in a case where the user 18 searches for an ablation plane, a change instruction to a geometrical characteristic corresponding to a cross section in which ablation is difficult is restricted.

The geometrical characteristic change unit 24E determines whether or not a cross section after change is a cross section in which ablation is difficult in an operation, by comparing information regarding the organ acquired from the storage 26 with the geometrical characteristic of the cross section changed based on the change instruction received through the reception device 14. The geometrical characteristic change unit 24E outputs a determination result to the control unit 24C.

The control unit 24C restricts the change instruction of the cross section based on the determination result acquired from the geometrical characteristic change unit 24E. Specifically, the control unit 24C makes the display device 16 notify of a warning message in a case where the second cross section 62 after change is a cross section in which ablation is difficult. A warning message region 56C is included in the screen 56. A warning message 56C1 is displayed in the warning message region 56C. The warning message 56C1 is a message "Ablation cannot be performed in designated cross section" as shown in FIG. 13 as an example. The user 18 operates the pointer 58 through the reception device 14 (here, as an example, the mouse 22) to search for a cross section in which ablation is possible.

As described above, in the medical service support device 10 according to the fourth embodiment, the instruction for the geometrical characteristic of the first cross section 61 is restricted based on information regarding the organ. Accordingly, with this configuration, it is possible to simply and easily search for a cross section for an organ compared to a case where the instruction for the geometrical characteristic is not restricted.

In the medical service support device 10 according to the fourth embodiment, information regarding the operation of the organ is included in information regarding the organ, and a geometrical characteristic of a cross section in which ablation is possible in the operation of the organ is received through the reception device 14. Accordingly, with this configuration, it is possible to simply and easily search for a cross section for an organ compared to a case where the instruction for the geometrical characteristic is not restricted.

In the fourth embodiment described above, although a form example where a message is displayed on the change instruction of the cross section to restrict an input has been described, the technique of the present disclosure is not limited thereto. For example, a form may be made in which, in a case where a cross section changed based on the change instruction of the cross section is a cross section in which ablation is difficult in the operation, the user 18 is notified using means, such as restricting the movement of the pointer 58 and/or the thumb 59A of the slider 59 or changing the color of the cross section displayed on the screen 56.

Fifth Embodiment

In a fifth embodiment, the region of interest 71 or the peripheral region 72 is specified, and the second cross section 62 is calculated from the position of the region of interest 71 or the peripheral region 72 and from the volume of the region where the region of interest 71 is included.

Figure 14:
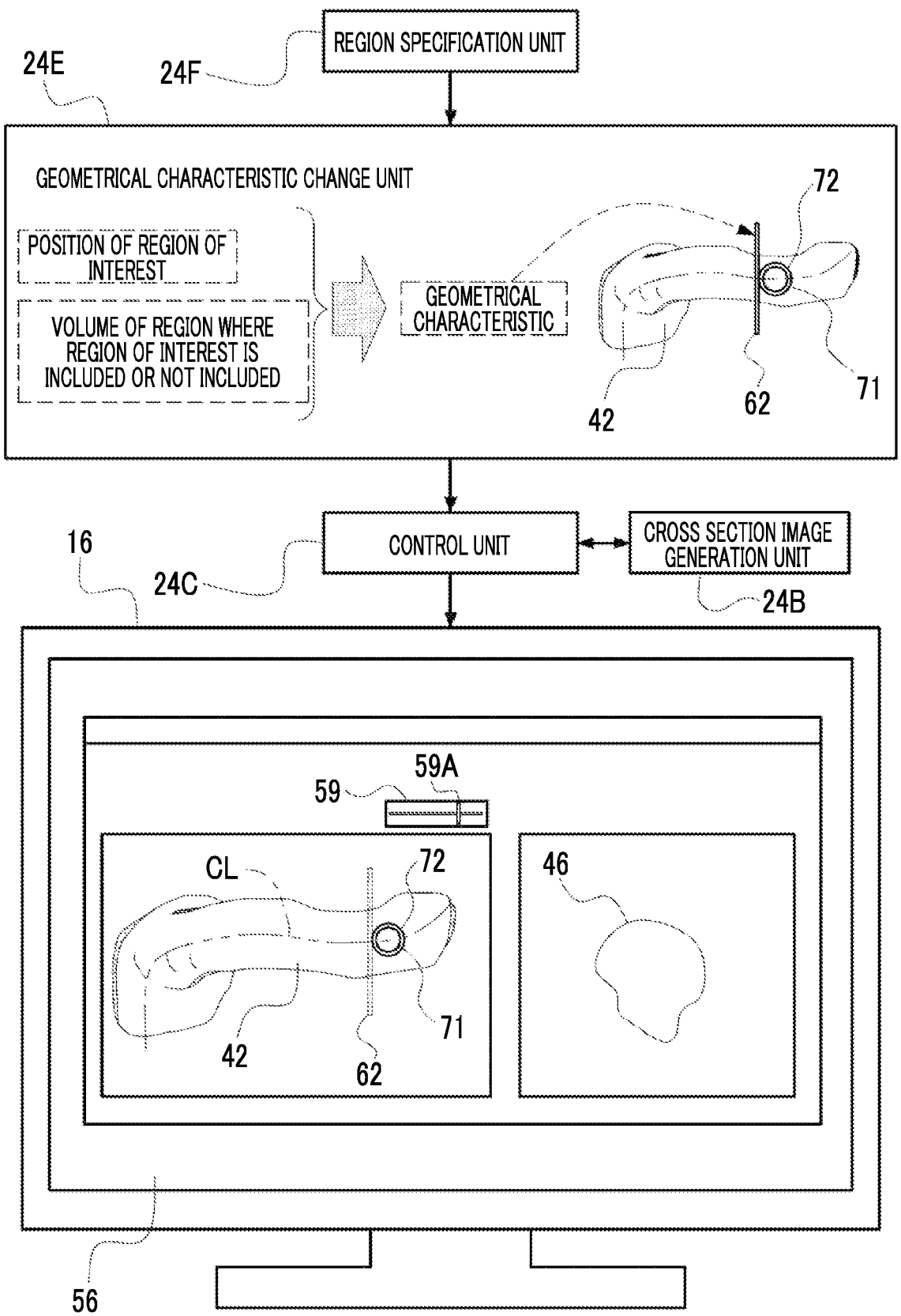
FIG. 14 is a conceptual diagram showing an example of an aspect where a geometrical characteristic of the second cross section is set.

As shown in FIG. 14 as an example, first, the region specification unit 24F specifies the region of interest 71 and the peripheral region 72 in the three-dimensional organ image 42. The geometrical characteristic change unit 24E acquires the positional information of the region of interest 71 or the peripheral region 72 specified by the region specification unit 24F. The geometrical characteristic change unit 24E sets the second cross section 62 that does not cross the region of interest 71 or the peripheral region 72, based on the positional information of the region of interest 71 or the peripheral region 72. Specifically, the geometrical characteristic change unit 24E calculates a geometrical characteristic of the second cross section 62 for maximizing the volume of the region where the region of interest 71 or the peripheral region 72 is not included, between the regions divided in the cross section. In particular, the geometrical characteristic change unit 24E calculates a geometrical characteristic for which the volume of the region where the region of interest 71 is not included is greater than the volume of the region where the region of interest 71 is included. The geometrical characteristic change unit 24E outputs the calculated geometrical characteristic of the second cross section 62 to the control unit 24C.

The control unit 24C outputs the acquired geometrical characteristic of the second cross section 62 to the cross section image generation unit 24B. The cross section image generation unit 24B generates a cross section image 46 based on the geometrical characteristic and outputs the cross section image 46 to the control unit 24C. The control unit 24C displays the three-dimensional organ image 42 and the cross section image 46 on the display device 16. Specifically, the control unit 24C performs display control such that the display device 16 displays the three-dimensional organ image 42, the second cross section 62, the cross section image 46 corresponding to the second cross section 62, and the region of interest 71 and the peripheral region 72 on the screen 56.

As shown in FIG. 14 as an example, the three-dimensional organ image 42 into which the second cross section 62 is inserted and which includes the region of interest 71 and the peripheral region 72, and the cross section image 46 corresponding to the second cross section 62 are displayed on the screen 56.

Although a form example where the geometrical characteristic change unit 24E calculates the geometrical characteristic of the second cross section 62 based on the volume of the region where the region of interest 71 or the peripheral region 72 is not included, the technique of the present disclosure is not limited thereto. The geometrical characteristic change unit 24E may calculate the geometrical characteristic of the second cross section 62 based on the volume of the region where the region of interest 71 or the peripheral region 72 is included. In this case, for example, the geometrical characteristic change unit 24E calculates the geometrical characteristic of the second cross section 62 for minimizing the volume of the region where the region of interest 71 or the peripheral region 72 is included.

As described above, in the medical service support device 10 according to the fifth embodiment, the geometrical characteristic change unit 24E specifies the region of interest 71 in the three-dimensional organ image 42. The geometrical characteristic change unit 24E calculates the geometrical characteristic of the second cross section 62 based on the position of the region of interest 71 and on the volume of the region where the region of interest 71 is included or is not included. Accordingly, it is possible to set a more suitable cross section compared to a case where the position of the region of interest 71 and the volume of the region where the region of interest 71 is not included or the volume of the region where the region of interest 71 is included are not considered.

In the medical service support device 10 according to the fifth embodiment, the geometrical characteristic change unit 24E calculates the geometrical characteristic of the second cross section 62 for maximizing the volume of the region where the region of interest 71 is not included. Accordingly, it is possible to allow the user 18 to visually ascertain the volume of the target part that remains after operation, compared to a case where the maximization of the volume of the region where the region of interest 71 is not included is not considered.

MODIFICATION EXAMPLES

In the above-described embodiments, although a form example where the display device 16 displays the three-dimensional organ image 42 and the cross section image 46 has been described, the technique of the present disclosure is not limited thereto. For example, a cross section image around the target part may be displayed together.

In this case, for example, the control unit 24C acquires the geometrical characteristic of the second cross section 62 from the geometrical characteristic change unit 24E. The control unit 24C outputs the acquired geometrical characteristic to the cross section image generation unit 24B. The cross section image generation unit 24B generates a transverse plane image 47, a sagittal plane image 48, and a coronal plane image 49 in the three-dimensional organ image 42 based on the acquired geometrical characteristic. The transverse plane image 47 is an image as viewed in a transverse plane (that is, as viewed in a cross section while cutting a three-dimensional image showing a human body into round slices) passing through a second position P2. The sagittal plane image 48 is an image as viewed in a sagittal plane (that is, as viewed in a longitudinal plane along a front-rear direction of the three-dimensional image showing a human body) passing through the second position P2. The coronal plane image 49 is an image as viewed in a coronal plane (that is, as viewed in a longitudinal plane along a right-left direction of the three-dimensional image) passing through the second position P2. The control unit 24C performs display control such that the display device 16 displays the three-dimensional organ image 42, the second cross section 62, the cross section image 46 corresponding to the second cross section 62, the transverse plane image 47, the sagittal plane image 48, and the coronal plane image 49 on the screen 56.

Figure 15:
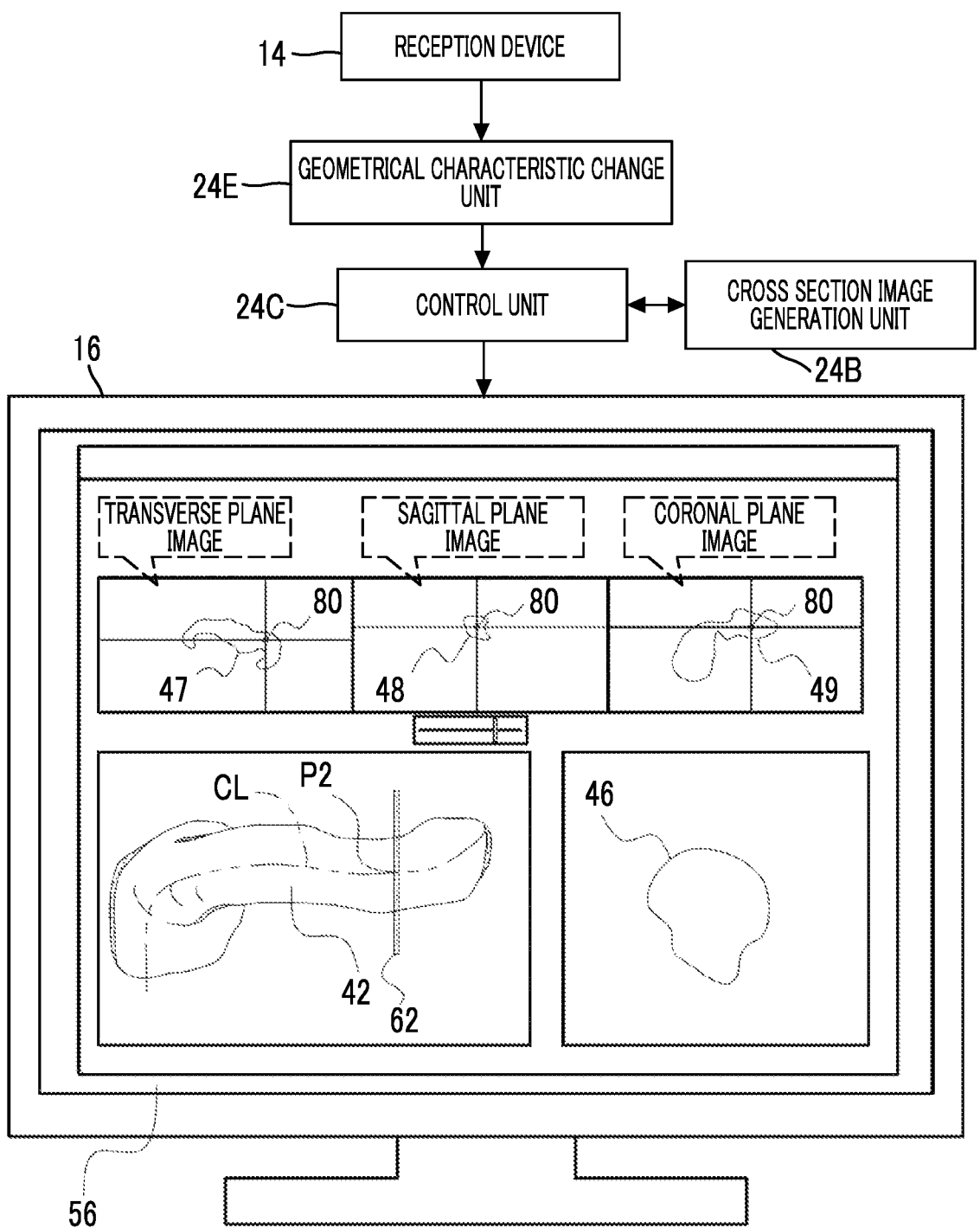
FIG. 15 is a conceptual diagram showing an example of an aspect where a sagittal plane, a coronal plane, and a transverse plane at a cross section position are displayed on the display device.

As shown in FIG. 15 as an example, the transverse plane image 47, the sagittal plane image 48, and the coronal plane image 49 are displayed on the screen 56 in an arranged state. In the transverse plane image 47, the sagittal plane image 48, and the coronal plane image 49, a cross cursor 80 is displayed at an in-image position corresponding to the second position P2 of the second cross section 62 in the three-dimensional organ image 42. In the example shown in FIG. 15, although the transverse plane image 47, the sagittal plane image 48, and the coronal plane image 49 are displayed in a horizontally arranged state, this is merely an example. The transverse plane image 47, the sagittal plane image 48, and the coronal plane image 49 may be displayed in a vertically arranged state. Although the transverse plane image 47, the sagittal plane image 48, and the coronal plane image 49 are displayed upward of the screen 56 with respect to the three-dimensional organ image 42 and the cross section image 46, this is merely an example. The transverse plane image 47, the sagittal plane image 48, and the coronal plane image 49 may be displayed downward of the screen 56 with respect to the three-dimensional organ image 42 and the cross section image 46.

In the above-described embodiments, as shown in FIG. 8 as an example, although as an example where the first cross section 61 is rotated with an intersecting point of the central axis CL and the first cross section 61 as a rotation center, a case where the first cross section 61 is rotated with the central axis CL as a rotation axis, and a form example where the first cross section 61 is rotated with the axis RA as a rotation axis have been described, the technique of the present disclosure is not limited thereto. For example, the rotation axis may be set optionally by the user 18.

In the above-described embodiments, although a form example where the control unit 24C directly controls the display device 16 such that the display device 16 displays the three-dimensional organ image 42 and the cross section image 46 has been described, the technique of the present disclosure is not limited thereto. For example, the control unit 24C may display the three-dimensional organ image 42 and/or the cross section image 46 on the display device 16 and/or on a screen other than the display device 16 through a personal computer and/or a server. The three-dimensional organ image 42 and the cross section image 46 may be displayed on separate screens.

In the above-described embodiments, although a form example where the search for a cross section is performed using the central axis CL calculated from the three-dimensional organ image 42 as the virtual axis has been described, the technique of the present disclosure is not limited thereto. For example, the user 18 may move the central axis CL calculated from the three-dimensional organ image 42 to a position (for example, a position displaced from the center) in the three-dimensional organ image 42, or an axis designated by the user 18 with respect to the three-dimensional organ image 42 may be used.

In the above-described embodiments, although a form example where the change instruction to the first cross section 61 is received by the reception device 14, and the cross section image 46 corresponding to the second cross section 62 obtained by changing the geometrical characteristic of the first cross section 61 is displayed on the screen 56 has been described, the technique of the present disclosure is not limited thereto. For example, the change instruction to the second cross section 62 may be further received through the reception device 14, and a cross section image 46 corresponding to a cross section obtained by changing the geometrical characteristic of the second cross section 62 may be displayed on the screen 56. That is, the second cross section 62 that is the cross section after the geometrical characteristic is changed may be handled as the first cross section 61 of which the geometrical characteristic is newly changed.

In the above-described embodiments, although a form example where the image processing is executed by the processor 24 of the image processing device 12 that is included in the medical service support device 10 has been described, the technique of the present disclosure is not limited thereto, and a device that executes the image processing may be provided outside the medical service support device 10.

Figure 16:
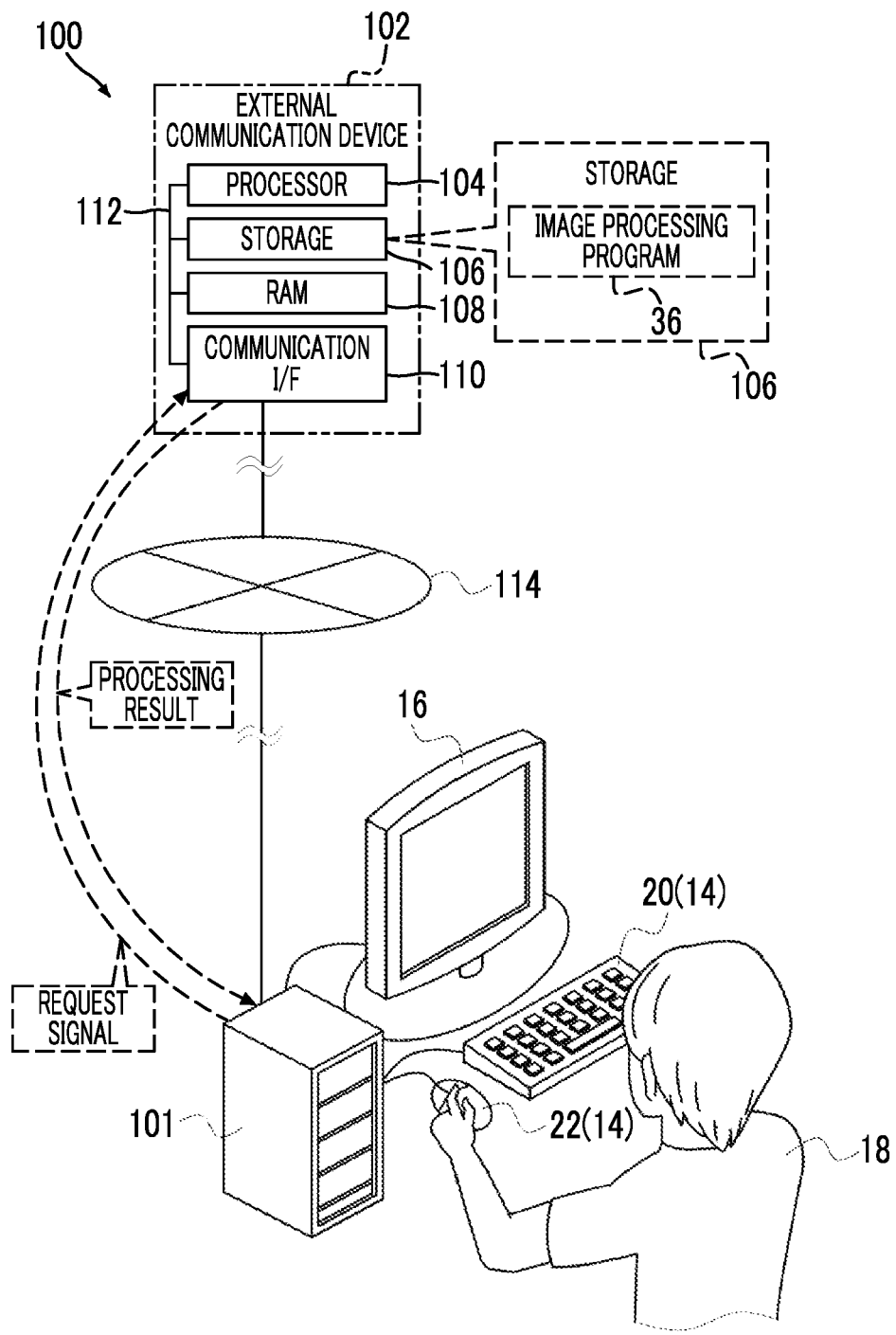
FIG. 16 is a conceptual diagram showing a schematic configuration of a medical service support system.

In this case, as shown in FIG. 16 as an example, a medical service support system 100 may be used. The medical service support system 100 comprises an information processing device 101 and an external communication device 102. The information processing device 101 is a device in which the image processing program 36 is removed from the storage 26 of the image processing device 12 that is included in the medical service support device 10 described in the above-described embodiments. The external communication device 102 is, for example, a server. The server is realized by, for example, a main frame. Here, although the main frame has been illustrated, this is merely an example, and the server may be realized by cloud computing or may be realized by network computing, such as fog computing, edge computing, or grid computing. Here, although the server is illustrated as an example of the external communication device 102, this is merely an example, and instead of the server, at least one personal computer or the like may be used as the external communication device 102.

The external communication device 102 comprises a processor 104, a storage 106, a RAM 108, and a communication I/F 110, and the processor 104, the storage 106, the RAM 108, and the communication I/F 110 are connected by a bus 112. The communication I/F 110 is connected to the information processing device 101 through a network 114. The network 114 is, for example, the Internet. The network 114 is not limited to the Internet, and may be a WAN and/or a LAN, such as an intranet.

In the storage 106, the image processing program 36 is stored. The processor 104 executes the image processing program 36 on the RAM 108. The processor 104 executes the above-described image processing following the image processing program 36 that is executed on the RAM 108.

The information processing device 101 transmits a request signal for requesting the execution of the image processing to the external communication device 102. The communication I/F 110 of the external communication device 102 receives the request signal through the network 114. The processor 104 executes the image processing following the image processing program 36 and transmits a processing result to the information processing device 101 through the communication I/F 110. The information processing device 101 receives the processing result (for example, a processing result by the geometrical characteristic change unit 24E) transmitted from the external communication device 102 with the communication I/F 30 (see FIG. 2) and outputs the received processing result to various devices, such as the display device 16.

In the example shown in FIG. 16, the external communication device 102 is an example of an "image processing device" according to the technique of the present disclosure, and the processor 104 is an example of a "processor" according to the technique of the present disclosure.

The image processing may be distributed to and executed by a plurality of devices including the information processing device 101 and the external communication device 102. In the above-described embodiments, although the three-dimensional image 38 is stored in the storage 26 of the medical service support device 10, an aspect may be made in which the three-dimensional image 38 is stored in the storage 106 of the external communication device 102 and is acquired from the external communication device 102 through the network before the image processing is executed.

In the above-described embodiments, although a form example where the image processing program 36 is stored in the storage 26 has been described, the technique of the present disclosure is not limited thereto. For example, the image processing program 36 may be stored in a storage medium (not shown), such as an SSD or a USB memory. The storage medium is a portable non-transitory computer readable storage medium. The image processing program 36 that is stored in the storage medium is installed on the medical service support device 10. The processor 24 executes the image processing following the image processing program 36.

The image processing program 36 may be stored in a storage device of another computer, a server, or the like connected to the medical service support device 10 through the network, the image processing program 36 may be downloaded in response to a request of the medical service support device 10 and may be installed on the medical service support device 10. That is, the program (program product) described in the present embodiment may be provided by a recording medium or may be distributed from an external computer.

The entire image processing program 36 may not be stored in the storage device of another computer, the server, or the like connected to the medical service support device 10 or in the storage 26, and a part of the image processing program 36 may be stored. The storage medium, the storage device of another computer, the server, or the like connected to the medical service support device 10, and other external storages may be placed as a memory that is connected to the processor 24 directly or indirectly and be used.

In the above-described embodiments, although the processor 24, the storage 26, the RAM 28, and the communication I/F 30 of the image processing device 12 are illustrated as a computer, the technique of the present disclosure is not limited thereto, and instead of the computer, a device including an application specific integrated circuit (ASIC), a field-programmable gate array (FPGA), and/or a programmable logic device (PLD) may be applied. Instead of the computer, a combination of a hardware configuration and a software configuration may be used.

As a hardware resource for executing the image processing described in the above-described embodiments, various processors described below can be used. Examples of the processors include a CPU that is a general-purpose processor configured to execute software, that is, the program, to function as the hardware resource for executing the image processing. Examples of the processors include a dedicated electric circuit that is a processor, such as an FPGA, a PLD, or an ASIC, having a circuit configuration dedicatedly designed for executing specific processing. A memory is incorporated in or connected to any processor, and any processor uses the memory to execute the image processing.

The hardware resource for executing the image processing may be configured with one of various processors or may be configured with a combination of two or more processors (for example, a combination of a plurality of FPGAs or a combination of a CPU and an FPGA) of the same type or different types. The hardware resource for executing the image processing may be one processor.

As an example where the hardware resource is configured with one processor, first, there is a form in which one processor is configured with a combination of one or more CPUs and software, and the processor functions as the hardware resource for executing the image processing. Second, as represented by system-on-a-chip (SoC) or the like, there is a form in which a processor that realizes all functions of a system including a plurality of hardware resources for executing the image processing into one integrated circuit (IC) chip is used. In this way, the image processing is realized using one or more processors among various processors described above as a hardware resource.

As the hardware structures of various processors, more specifically, an electric circuit in which circuit elements, such as semiconductor elements, are combined can be used. The above-described image processing is just an example. Accordingly, it goes without saying that unnecessary steps may be deleted, new steps may be added, or a processing order may be changed without departing from the gist.

The content of the above description and the content of the drawings are detailed description of portions according to the technique of the present disclosure, and are merely examples of the technique of the present disclosure. For example, the above description relating to configuration, function, operation, and advantageous effects is description relating to configuration, function, operation, and advantageous effects of the portions according to the technique of the present disclosure. Thus, it goes without saying that unnecessary portions may be deleted, new elements may be added, or replacements may be made to the content of the above description and to the content of the drawings without departing from the gist of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and from the content of the drawings.

In the specification, "A and/or B" is synonymous with "at least one of A or B". That is, "A and/or B" may refer to A alone, B alone, or a combination of A and B. Furthermore, in the specification, a similar concept to "A and/or B" applies to a case in which three or more matters are expressed by linking the matters with "and/or".

All cited documents, patent applications, and technical standards described in the specification are incorporated by reference in the specification to the same extent as in a case where each individual cited document, patent application, or technical standard is specifically and individually indicated to be incorporated by reference.

What is claimed is:

1. An image processing device comprising:
a processor,
wherein the processor is configured to
output information for displaying a three-dimensional target part image as a three-dimensional image showing a target part, on a display device,
extract a virtual axis of the target part in the three-dimensional target part image by executing a thinning processing on the three-dimensional target part image,
specify a geometrical characteristic of a first cross section on the virtual axis of the target part in the three-dimensional target part image,
acquire a plurality of pixel values in the three-dimensional target part image in a plurality of cross sections,
generate a two-dimensional image corresponding to a first cross section crossing a first position on the virtual axis from the plurality of pixel values,
output information for displaying the two-dimensional image corresponding to the first cross section crossing the first position on the virtual axis, on the display device,
change the geometrical characteristic of the first cross section in response to an instruction to change the geometrical characteristic,
generate a two-dimensional image corresponding to a second cross section obtained by changing the geometrical characteristic of the first cross section from the plurality of pixel values, and output information for displaying the two-dimensional image corresponding to the second cross section obtained by changing the geometrical characteristic of the first cross section, on the display device.

2. The image processing device according to claim 1, wherein the geometrical characteristic is at least one of a position of the first cross section on the virtual axis or an inclination of the first cross section with respect to the virtual axis.

3. The image processing device according to claim 1, wherein a position of the second cross section is at least one of a position where the first cross section is slid in a virtual axis direction, a position where the first cross section is rotated with the virtual axis as a rotation axis, or a position where the first cross section is rotated with an axis crossing the virtual axis and following a normal direction of the first cross section as a rotation axis.

4. The image processing device according to claim 1, wherein the processor is configured to divide the three-dimensional target part image into a first region and a second region along the second cross section.

5. The image processing device according to claim 4, wherein the processor is configured to output information for displaying any one of the first region or the second region on the display device.

6. The image processing device according to claim 5, wherein the processor is configured to output, based on information specifying a region of interest in the three-dimensional target part image, information for displaying a region where the region of interest is not included, out of the first region and the second region, on the display device.

7. The image processing device according to claim 1, wherein the processor is configured to
specify a region of interest in the three-dimensional target part image, and
calculate the geometrical characteristic based on a position of the region of interest in the three-dimensional target part image and on a volume of a region where the region of interest is not included or a volume of a region where the region of interest is included.

8. The image processing device according to claim 7, wherein the processor is configured to calculate a geometrical characteristic for maximizing a volume of the region where the region of interest is not included, out of regions to be a display target in the three-dimensional target part image.

9. The image processing device according to claim 1, wherein the virtual axis is a central axis of the target part.

10. The image processing device according to claim 1, wherein the processor is configured to
specify a region of interest in the three-dimensional target part image, and
output information for displaying a region in a designated range from the region of interest as a peripheral region of the region of interest.

11. The image processing device according to claim 10, wherein the processor is configured to make a notification device give notification in a case where the peripheral region crosses at least one of the first cross section or the second cross section.

12. The image processing device according to claim 1, wherein the target part is a designated organ, and the three-dimensional target part image is a three-dimensional organ image showing the organ.

13. The image processing device according to claim 12, wherein the processor is configured to restrict the instruction for the geometrical characteristic of the first cross section based on information regarding the organ.

14. The image processing device according to claim 13, wherein the information regarding the organ includes information regarding an operation of the organ.

15. The image processing device according to claim 12, wherein the processor is configured to specify a region of interest in the three-dimensional organ image, and
the region of interest is a region showing a lesion part in the organ.

16. The image processing device according to claim 12, wherein the organ is a pancreas.

17. The image processing device according to claim 1, wherein a position of the second cross section is at least one of a position where the first cross section is slid in a virtual axis direction, a position where the first cross section is rotated with the virtual axis as a rotation axis, or a position where the first cross section is rotated with an axis crossing the virtual axis and following a normal direction of the first cross section as a rotation axis, and
wherein the processor is configured to divide the three-dimensional target part image into a first region and a second region along the second cross section.

18. The image processing device according to claim 1, wherein the processor is configured to
specify a region of interest in the three-dimensional target part image, and
calculate the geometrical characteristic based on a position of the region of interest in the three-dimensional target part image and on a volume of a region where the region of interest is not included or a volume of a region where the region of interest is included, and
wherein the geometrical characteristic is at least one of a position of the first cross section on the virtual axis or an inclination of the first cross section with respect to the virtual axis.

19. An image processing method comprising:
outputting information for displaying a three-dimensional target part image as a three-dimensional image showing a target part, on a display device;
extracting a virtual axis of the target part in the three-dimensional target part image by executing a thinning processing on the three-dimensional target part image;
specifying a geometrical characteristic of a first cross section on the virtual axis of the target part in the three-dimensional target part image;
acquiring a plurality of pixel values in the three-dimensional target part image in a plurality of cross sections;
generating a two-dimensional image corresponding to a first cross section crossing a first position on the virtual axis from the plurality of pixel values;
outputting information for displaying the two-dimensional image corresponding to the first cross section crossing the first position on the virtual axis, on the display device;
changing the geometrical characteristic of the first cross section in response to an instruction to change the geometrical characteristic;
generating a two-dimensional image corresponding to a second cross section obtained by changing the geometrical characteristic of the first cross section from the plurality of pixel values; and outputting information for displaying the two-dimensional image corresponding to the second cross section obtained by changing the geometrical characteristic of the first cross section, on the display device.

20. A non-transitory storage medium storing program that causes a computer to execute a process, the process comprising:

outputting information for displaying a three-dimensional target part image as a three-dimensional image showing a target part, on a display device;

extracting a virtual axis of the target part in the three-dimensional target part image by executing a thinning processing on the three-dimensional target part image;

specifying a geometrical characteristic of a first cross section on the virtual axis of the target part in the three-dimensional target part image;

acquiring a plurality of pixel values in the three-dimensional target part image in a plurality of cross sections;

generating a two-dimensional image corresponding to a first cross section crossing a first position on the virtual axis from the plurality of pixel values;

outputting information for displaying the two-dimensional image corresponding to the first cross section crossing the first position on the virtual axis, on the display device;

changing the geometrical characteristic of the first cross section in response to an instruction to change the geometrical characteristic;

generating a two-dimensional image corresponding to a second cross section obtained by changing the geometrical characteristic of the first cross section from the plurality of pixel values; and outputting information for displaying the two-dimensional image corresponding to the second cross section obtained by changing the geometrical characteristic of the first cross section, on the display device.

* * * * *